(12) United States Patent
Sawyer et al.

(10) Patent No.: US 11,288,919 B2
(45) Date of Patent: Mar. 29, 2022

(54) SYSTEMS AND METHODS FOR GENERATING MULTIDIMENSIONAL DATA STRUCTURES BASED ON FANTASY SPORTS ACCOUNT ACTIVITY

(71) Applicant: DraftKings, Inc., Boston, MA (US)

(72) Inventors: Rick Sawyer, Boston, MA (US); Jordan Mendell, Boca Raton, FL (US); Frank Lo, Boston, MA (US); Alexander John Krusz, Somerville, MA (US); Brendan Thompson Grove, Brookline, MA (US)

(73) Assignee: DraftKings, Inc., Boston, MA (US)

( * ) Notice: Subject to any disclaimer, the term of this patent is extended or adjusted under 35 U.S.C. 154(b) by 351 days.

(21) Appl. No.: 16/437,782

(22) Filed: Jun. 11, 2019

(65) Prior Publication Data
US 2019/0378374 A1 Dec. 12, 2019

Related U.S. Application Data

(60) Provisional application No. 62/683,398, filed on Jun. 11, 2018.

(51) Int. Cl.
*G06F 16/00* (2019.01)
*G07F 17/32* (2006.01)
(Continued)

(52) U.S. Cl.
CPC .... *G07F 17/3237* (2013.01); *G06F 16/24578* (2019.01); *G06F 16/285* (2019.01);
(Continued)

(58) Field of Classification Search
CPC ............ G07F 17/3244; G07F 17/3288; G07F 17/3237; G07F 17/3255; G07F 17/3258;
(Continued)

(56) References Cited

U.S. PATENT DOCUMENTS

| | | | | |
|---|---|---|---|---|
| 2008/0102911 A1* | 5/2008 | Campbell | ........... | G06F 16/9535 463/9 |
| 2014/0207840 A1* | 7/2014 | Smith | ................ | H04N 21/8193 709/201 |

(Continued)

*Primary Examiner* — Shyue Jiunn Hwa
(74) *Attorney, Agent, or Firm* — Foley & Lardner LLP

(57) ABSTRACT

Systems and methods for generating a multidimensional data structure based on fantasy sports account activity are described herein. Processors can maintain user profiles, each user profile having player lineups associated with fantasy sports contests. The processors can identify, for a first user profile, player lineups of the first user profile and respective contests for which the player lineups were entered. Each player lineup including players having players attributes. Each contest having contest attributes. The processors can generate, for the first user profile, a multidimensional data structure including a plurality of features. Each feature can have a respective value that is based on the player attributes corresponding to the players included in the player lineups and the contest attributes corresponding to the contests for which the player lineups were entered. The processors can then provide content selected using the generated multidimensional data structure to a device associated with the user profile.

18 Claims, 16 Drawing Sheets

Lobby 202

| Sport | Contest | Style | Entry Fee | Total Prizes | Registrants | Live |
|---|---|---|---|---|---|---|
| Football | C1 | Classic | $5 | G$500,000 | 235K/118.9K | 00:22 |
| Football | C2 | Classic | $22 | G$200,000 | 22/7067 | 00:22 |
| Basketball | C3 | Pick'Em | $22 | G$250,000 | 143/14.7K | 01:01 |
| Football | C4 | Classic | $25 | G$7,000 | 6/302 | 00:45 |
| Football | C5 | Classic | $33 | G$125,000 | 24/5322 | 01:01 |
| Basketball | C6 | Classic | $8 | G$200,000 | 52/16.6K | 01:21 |
| Football | C7 | Pick'Em | $25 | G$8,000 | 3/295 | 00:45 |

Computer Resource Allocation 204

| C1 | C2 | C3 | | |
|---|---|---|---|---|
| C4 | C5 | C6 | C7 | Free |

(51) Int. Cl.
- *G06F 16/9535* (2019.01)
- *G06F 16/2457* (2019.01)
- *G06F 16/33* (2019.01)
- *G06F 16/35* (2019.01)
- *G06F 16/28* (2019.01)

(52) U.S. Cl.
CPC .......... *G06F 16/3347* (2019.01); *G06F 16/35* (2019.01); *G06F 16/9535* (2019.01); *G07F 17/3211* (2013.01); *G07F 17/3244* (2013.01); *G07F 17/3209* (2013.01)

(58) Field of Classification Search
CPC ............. G07F 17/3227; G07F 17/3234; G07F 17/3272; G07F 17/34; G07F 17/326; G07F 17/3267; G07F 17/3209; G07F 17/3211; G07F 17/3276; G06F 15/16; G06F 16/24578; G06F 16/9535; G06F 40/106; G06F 9/44; G06F 3/0484; G06F 9/451; G06F 16/285; G06F 16/3347; G06F 16/35; G06F 3/1438; G06F 3/1446; A63F 13/65; A63F 13/828; A63F 2300/69; A63F 13/00; A63F 13/211; A63F 13/32; A63F 13/335; A63F 13/34; A63F 13/35; A63F 13/46; A63F 13/5255; A63F 13/533; A63F 13/537; A63F 13/58; A63F 13/812; A63F 2300/105; A63F 2300/308; A63F 2300/634; A63F 2300/65; A63F 2300/6676; A63F 2300/8011; H04N 21/2187; H04N 21/44008; H04N 21/8456; H04N 21/854; H04N 21/23418; H04N 21/23424; H04N 21/23439; H04N 21/2665; H04N 21/2668; H04N 21/4307; H04N 21/435; H04N 21/44016; H04N 21/458; H04N 21/4622; H04N 21/47; H04N 21/8126; H04N 21/8133; H04N 21/8146; H04N 21/8549; H04N 5/2624; H04N 5/2625; H04N 7/181; G06K 2009/00738; G06K 9/00342; G06K 9/00711; G06K 9/00724; G06K 9/00751; G06K 9/78

See application file for complete search history.

(56) References Cited

U.S. PATENT DOCUMENTS

| | | | |
|---|---|---|---|
| 2014/0221095 A1* | 8/2014 | MacNaughton | A63F 13/216 463/35 |
| 2014/0282745 A1* | 9/2014 | Chipman | H04N 21/4826 725/61 |
| 2017/0165581 A1* | 6/2017 | McAuley | A63F 13/65 |
| 2018/0020243 A1* | 1/2018 | Ni | G11B 27/031 |

* cited by examiner

Lobby 202

| Sport | Contest | Style | Entry Fee | Total Prizes | Registrants | Live |
|---|---|---|---|---|---|---|
| Football | C1 | Classic | $5 | G$500,000 | 235K/118.9K | 00:22 |
| Football | C2 | Classic | $22 | G$200,000 | 22/7067 | 00:22 |
| Basketball | C3 | Pick'Em | $22 | G$250,000 | 143/14.7K | 01:01 |
| Football | C4 | Classic | $25 | G$7,000 | 6/302 | 00:45 |
| Football | C5 | Classic | $33 | G$125,000 | 24/5322 | 01:01 |
| Basketball | C6 | Classic | $8 | G$200,000 | 52/16.6K | 01:21 |
| Football | C7 | Pick'Em | $25 | G$8,000 | 3/295 | 00:45 |

Lobby 202

| Sport | Contest | Style | Entry Fee | Total Prizes | Registrants | Live |
|---|---|---|---|---|---|---|
| Football | C1 | Classic | $5 | G$500,000 | 965K/118.9K | 00:22 |
| Football | C2 | Classic | $22 | G$200,000 | 5024/7067 | 00:22 |
| Basketball | C3 | Pick'Em | $22 | G$250,000 | 11.2K/14.7K | 01:01 |
| Football | C4 | Classic | $25 | G$7,000 | 255/302 | 00:45 |

| Multidimensional Data Structure 605 | | | User Metric |
|---|---|---|---|
| Feature | Attribute Type | Attribute | |
| Feature A | Player A | Team | 1 |
| Feature B | Player B | Position | 3 |
| Feature C | Contest A | Sport Type | 4 |
| Feature D | Contest B | Entry Fee | 2 |

Fig. 6B

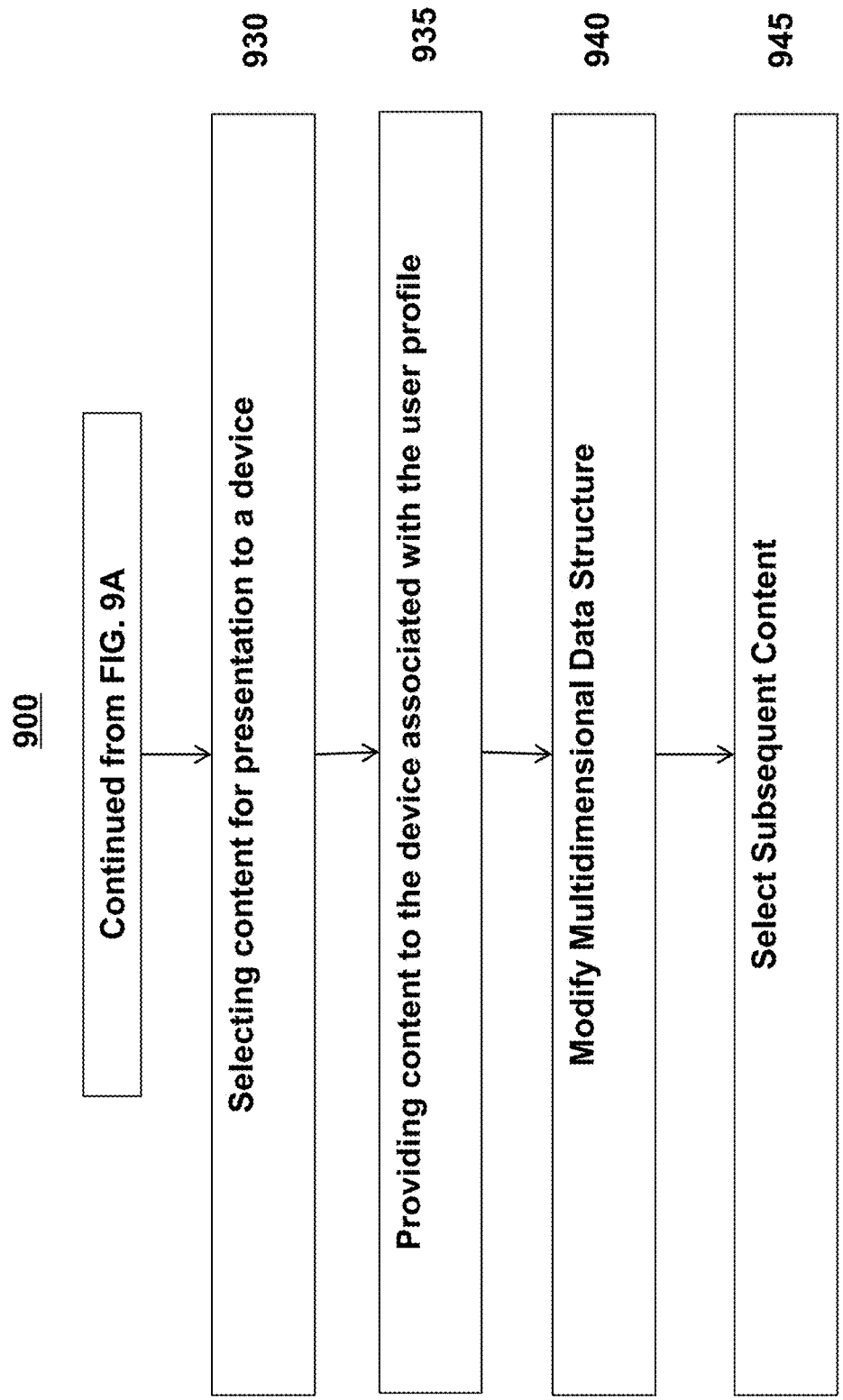

SYSTEMS AND METHODS FOR GENERATING MULTIDIMENSIONAL DATA STRUCTURES BASED ON FANTASY SPORTS ACCOUNT ACTIVITY

CROSS-REFERENCE TO RELATED APPLICATIONS

The present application claims the benefit of and priority to U.S. Provisional Application 62/683,398, filed on Jun. 11, 2018. The entire disclosure of which is incorporated herein by reference in its entirety.

BACKGROUND OF THE DISCLOSURE

Content management systems allocate and use a lot of computing resources to transmit content to a very large number of remote computing devices. Similarly, remote computing devices also allocate and use a lot of computing resources to receive and display the content received from the content management systems. In the case of mobile devices where memory, processing power and power are all finite resources, the receipt and display of content that is not contextually relevant to a user can adversely affect the device's performance and life as well the overall user experience. As such, content management systems should utilize appropriate resource management policies to reduce the amount of contextually irrelevant content being delivered to the remote computing devices.

BRIEF SUMMARY OF THE DISCLOSURE

The present disclosure relates to one or more systems and methods for generating a multidimensional data structure to provide content for one or more users from a plurality of users having similar profile attributes. The multidimensional data structure can be used to identify similarities between multiple user profiles based in part on attributes of players lineups in the respective user's profile and/or one or more contests (e.g., fantasy contests, betting contests) the respective user has participated in. The multidimensional data structure can correlate the similarities between the user profiles to provide for optimization of the content provided to each of the plurality of users. For example, one or more user profiles can be modified or otherwise updated using the multidimensional data structure to identify contests that the user is more likely to be interested in and participate in based in part on their similarities with other user profiles in the plurality of user profiles.

In at least one aspect, a method for generating a multidimensional data structure using fantasy sports account activity is provided. The method can include maintaining, by one or more processors, a plurality of user profiles, each of the user profiles having one or more player lineups associated with at least one fantasy sports contest. The method can include identifying, by the one or more processors, for a first user profile of the plurality of user profiles, one or more player lineups of the first user profile and one or more respective contests for which the player lineups were entered, each of the player lineups including a plurality of players. Each of the plurality of players can include one or more player attributes. Each of the contests can include one or more contest attributes. The method can include generating, by the one or more processors, for the first user profile, a multidimensional data structure including a plurality of features. Each feature can include a respective value that is based on the player attributes corresponding to the players included in the one or more player lineups and the contest attributes corresponding to the one or more respective contests for which the player lineups were entered. The method can include selecting, by the one or more processors using the multidimensional data structure, content for presentation to a device associated with the user profile. The content can be selected using an association between at least one player attribute and at least one contest attribute identified by the multidimensional data structure. The method can include providing, by the one or more processors, using the generated multidimensional data structure, the content to the device associated with the user profile.

In embodiments, the one or more player attributes can include one or more of the following: a name, a sport category, a location, a team value, a position value, a price parameter and one or more future contests specific to the respective player. The one or more contest attributes can include one or more of the following: a sport category, a price parameter, a prize parameter, a registrant threshold, a registrant limit, a current registrant count, a day value, a time value, a duration value, a contest type, and an experience level. Each user profile in the plurality of user profiles can include data corresponding to user interactions with one or more fantasy sports contests executing on a device associated with the respective user.

In embodiments, the method can include determining a user type for each user profile in the plurality of user profiles based on a frequency of use and determining a skill level for each user profile in the plurality of user profiles based on an outcome value corresponding to one or more fantasy sports contests the respective user participated in.

The method can include generating an activity profile for each user profile having data associated with one or more fantasy sports contests the respective user participated in. The method can include modifying the multidimensional data structure responsive to the activity profile of the first user profile. The method can include selecting subsequent content for the first user profile based on the modification to the multidimensional data structure. The method can include updating a second user profile based on the activity profile of the first user profile.

In embodiments, the method can include generating, using a clustering algorithm, a user cluster based on a plurality of multidimensional data structures corresponding to the plurality of user profiles. Each user profile in the user cluster can include multiple player attributes in common and multiple contest attributes in common. The method can include receiving, by the one or more processors, one or more contest attributes data from a third party server and determining, by the one or more processors using the multidimensional data structure, the association between the at least player attribute and the at least one contest attributes using the one or more contest attributes from the third party server. The method can include determining, by the one or more processors, a profile association between the user profile and the multidimensional data structure and storing, by the one or more processors, the profile association in the user profile. The method can include modifying, by the one or more processors, at least one player attribute or at least one contest attribute associated with the user profile using a user behavior metric from the one or more respective contests for which the player lineups were previously entered. The method can include generating, by the one or more processors, one or more features of the plurality of features to include the at least one modified player attribute or the at least one modified contest attribute.

In at least one aspect, a system for generating a multidimensional data structure using fantasy sports account activity is provided. The system can include one or more processors and memory. The memory can include computer-readable instructions stored in memory that, when executed by the one or more processors, cause the one or more processors to maintain a plurality of user profiles. Each of the user profiles can include one or more player lineups associated with at least one fantasy sports contest. The instructions can cause the one or more processors to identify, for a first user profile of the plurality of user profiles, one or more player lineups of the first user profile and one or more respective contests for which the player lineups were entered. Each of the player lineups can include a plurality of players. Each of the plurality of players can include one or more player attributes. Each of the contests can include one or more contest attributes. The instructions can cause the one or more processors to generate, for the first user profile, a multidimensional data structure including a plurality of features. Each feature can include a respective value that is based on the player attributes corresponding to the players included in the one or more player lineups and the contest attributes corresponding to the one or more respective contests for which the player lineups were entered. The instructions can cause the one or more processors to select, using the multidimensional data structure, content for presentation to a device associated with the user profile. The content can be selected using an association between at least one player attribute and at least one contest attribute identified by the multidimensional data structure. The instructions can cause the one or more processors to provide, using the generated multidimensional data structure, the content to the device associated with the user profile.

In embodiments, the instructions can cause the one or more processors to determine a user type for each user profile in the plurality of user profiles based on a frequency of use and determine a skill level for each user profile in the plurality of user profiles based on an outcome value corresponding to one or more fantasy sports contests the respective user participated in. The instructions can cause the one or more processors to generate an activity profile for each user profile having data associated with one or more fantasy sports contests the respective user participated in, modify the multidimensional data structure responsive to the activity profile of the first user profile, and select subsequent content for the first user profile based on the modification to the multidimensional data structure. The instructions can cause the one or more processors to update a second user profile based on the activity profile of the first user profile.

In embodiments, the instructions can cause the one or more processors to generate, using a clustering algorithm, a user cluster based on a plurality of multidimensional data structures corresponding to the plurality of user profiles, wherein each user profile in the user cluster having multiple player attributes in common and multiple contest attributes in common. The instructions can cause the one or more processors to receive, by the one or more processors, one or more contest attributes data from a third party server, and determine, by the one or more processors using the multidimensional data structure, the association between the at least player attribute and the at least one contest attributes using the one or more contest attributes from the third party server. The instructions can cause the one or more processors to determine a profile association between the user profile and the multidimensional data structure and store the profile association in the user profile. The instructions can cause the one or more processors to modify at least one player attribute or at least one contest attribute associated with the user profile using a user behavior metric from the one or more respective contests for which the player lineups were previously entered and generate one or more features of the plurality of features to include the at least one modified player attribute or the at least one modified contest attribute.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 6B depicts one or more embodiments of a data structure having a features with a user behavior metric applied to the respective features;

FIGS. 9A-9B shows a flow diagram of a method for generating a multidimensional data structure.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for monitoring a pace of registrations of contests for improved allocation of computer resources and for ranking contests.

Section C describes embodiments of systems and method for generating a multidimensional data structure to generate content for one or more users from a plurality of users having similar profile attributes.

A. Computing and Network Environment

Figure 1A:
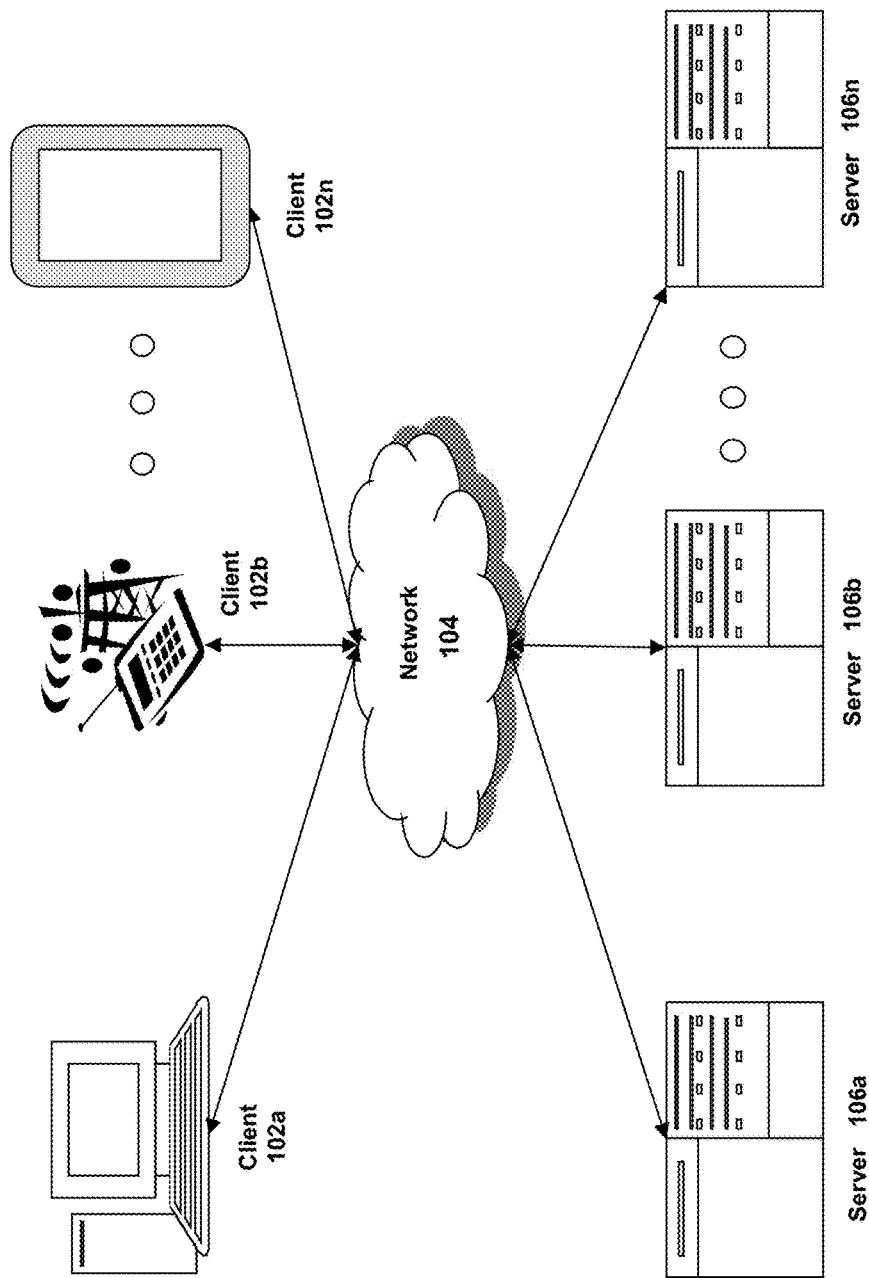
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
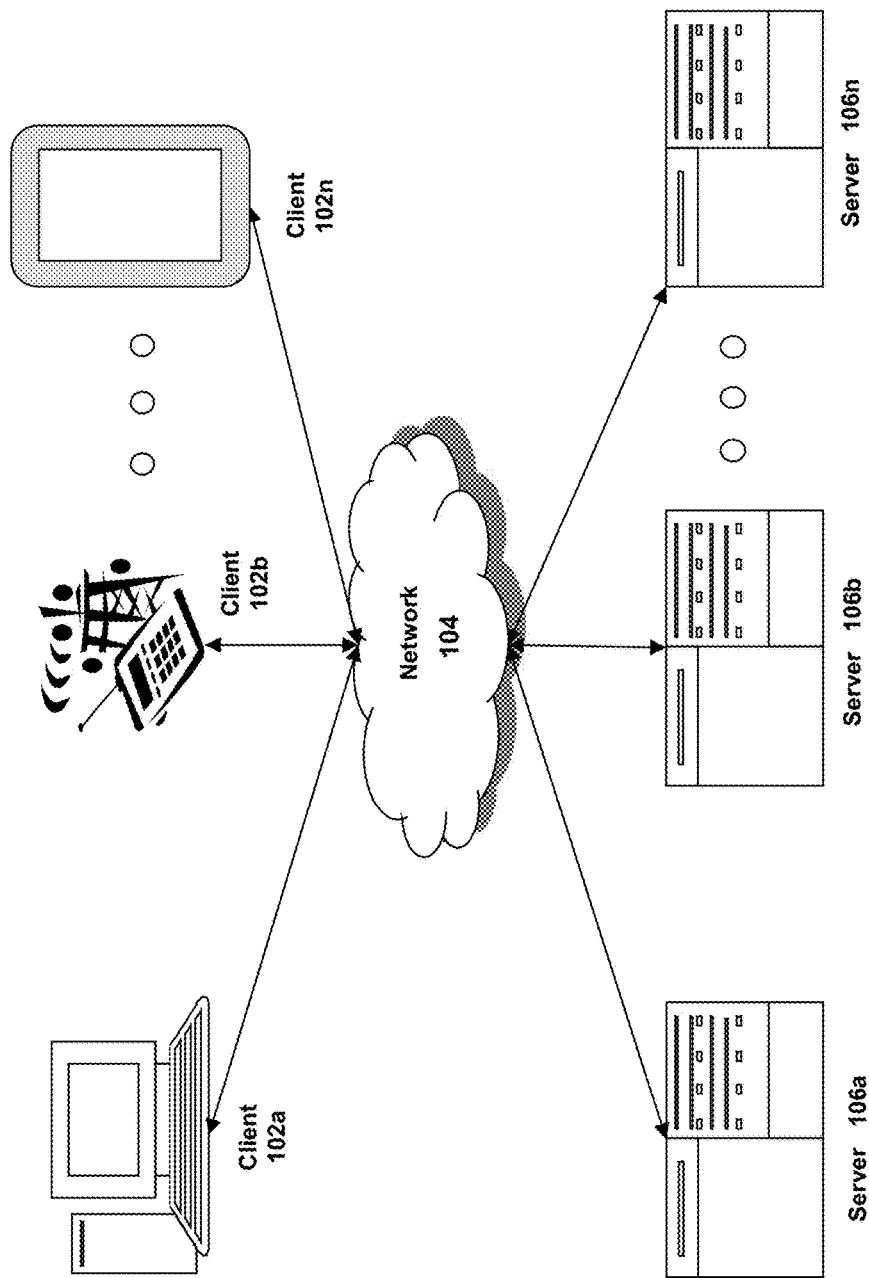
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
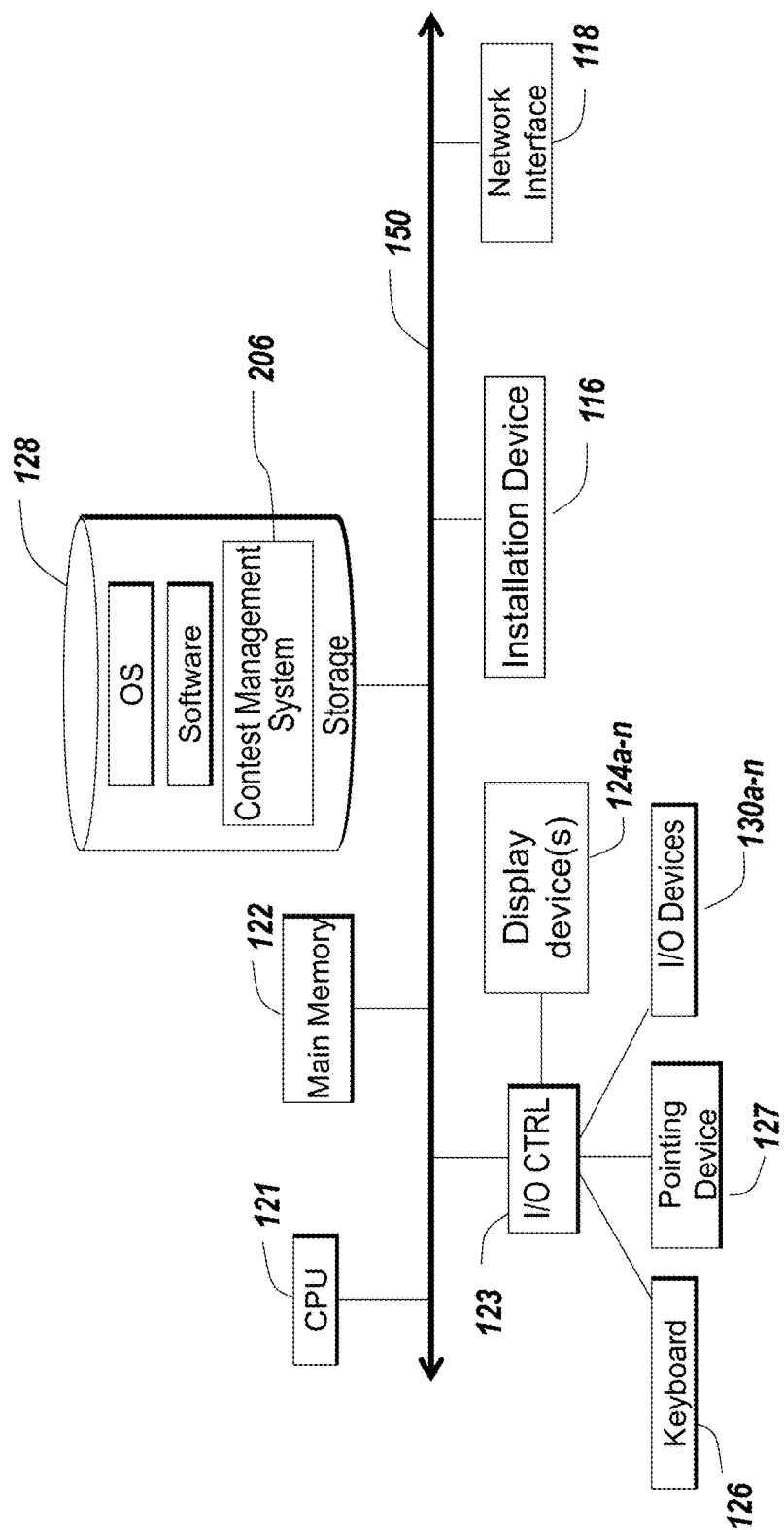
FIGS. 1C and 1D are block diagrams depicting embodiments of computing devices useful in connection with the methods and systems described herein.
Figure 1D:
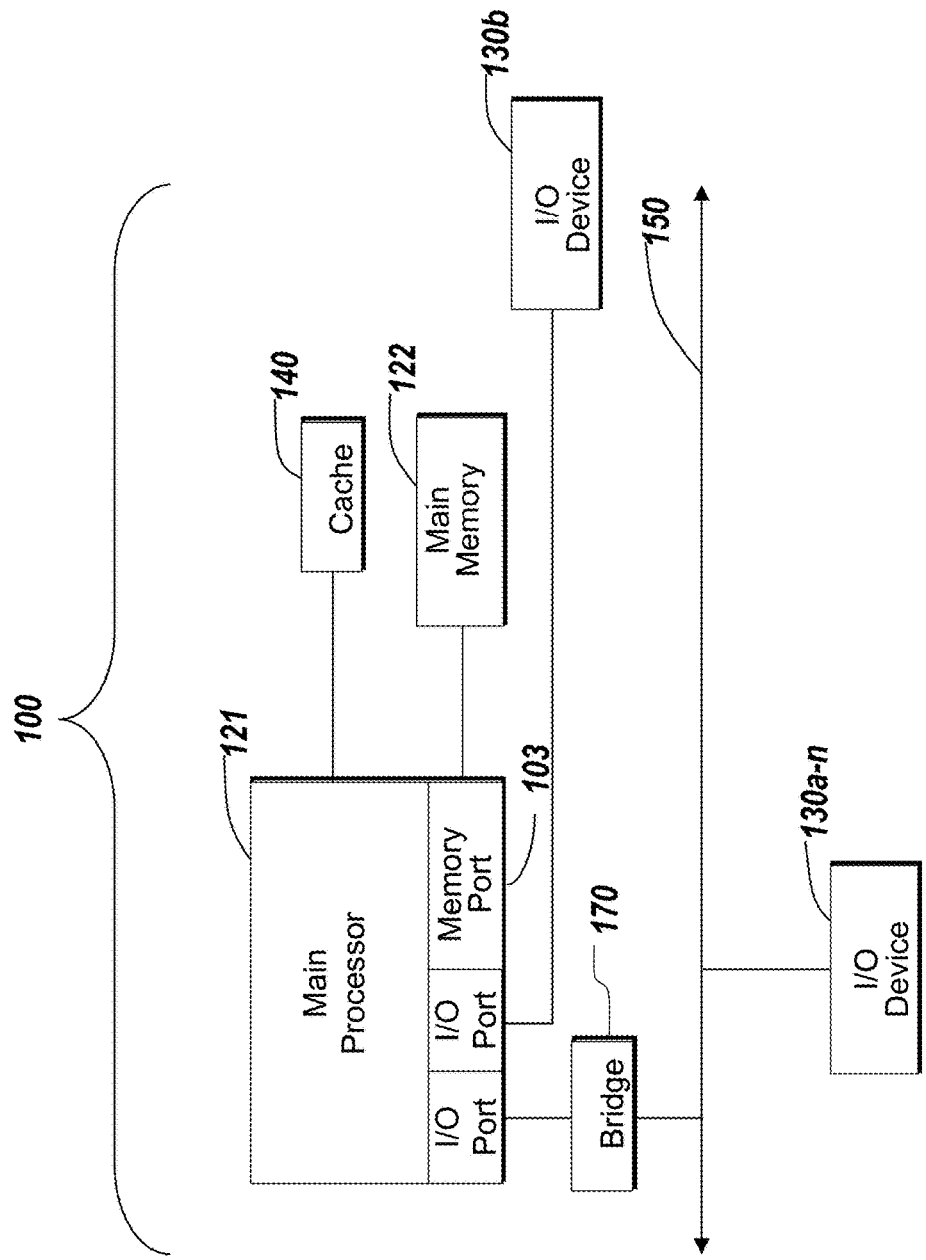

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a contest management system 206. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the contest management system 206. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2050, WINDOWS Server 2022, WINDOWS CE, WINDOWS Phone, WINDOWS XP, WINDOWS VISTA, and WINDOWS 7, WINDOWS RT, WINDOWS 8, and WINDOWS 10, all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods For Monitoring A Pace of Registrations of Contests for Improved Allocation of Computer Resources As discussed above, systems and methods of the present solution are directed to generating contests to improve computer resource allocation. A contest generating system can avoid or can delay generating new contests and thus avoid registrant dispersion issues, and can help to ensure that fewer contests with more registrants are generated, thus conserving and better allocating computer resources.

According to one aspect, a method for generating contests includes maintaining, by a contest management system including one or more processors, for each first contest of a plurality of first contests managed by the contest management system, historical registration data. The historical registration data identifies, for each time of a plurality of times during which registration of the first contest was open, a number of registrants at the time. Each first contest has respective parameter values of one or more parameters used to generate the first contest. The method further includes identifying, by the contest management system, for a second contest that has an open registration status, respective parameter values of one or more parameters used to generate the second contest, and registration data identifying, for each time of a plurality of times that has lapsed since registration for the second contest was opened, a current number of registrants at the time. The method further includes computing, by the contest management system, a similarity score between the second contest and each first contest of the plurality of first contests. The similarity score can be computed using i) the respective parameter values used to generate the second contest and generate the first contest and ii) the registration data of the second contest and the historical registration data of the first contest. The method further includes selecting, by the contest management system, for the second contest, a subset of the plurality of first contests based on the similarity score exceeding a threshold similarity score value. The method further includes generating, by the contest management system, for the second contest, a projected number of registrants based on i) a current number of registrants of the second contest and ii) the historical registration data of one or more first contests included in the selected subset. The method further includes determining, by the contest management system, a time at which to generate a fourth contest based on the projected number of registrants, and generating, by the contest management system, the fourth contest at the determined time.

Figure 2A:
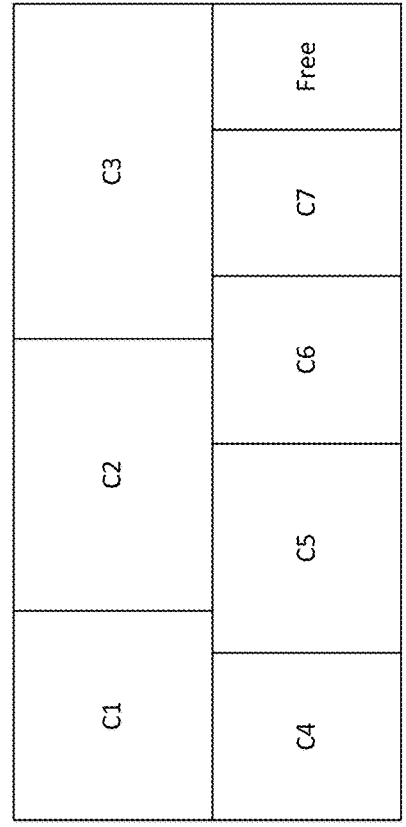
FIG. 2A depicts a contest lobby showing contests and a corresponding allocation of computer resources.

Referring now to FIG. 2A, a representation of a lobby 202 including contests C1 through C7 is shown. Data or computer resources to allow a client device to render or otherwise present the lobby 202 may be transmitted to the client device by the contest management system 206. The lobby 202 shows seven contests that are open for registration on a first page or first screen, but more contests (including one or more that are open for registration) can be maintained by the contest management system 206 and may be displayable responsive to the client device transmitting a request for more contests to the contest management system 206.

The lobby 202 may show, for one or more of the contests C1 through C7 (e.g. for each contest), a sport category, a contest name or identifier, a contest style, an entry fee, a total prize pool for the contest, a total number of entries and a maximum registrant cap (which may be a dynamic cap that increases or decreases over time, or increases or decreases based on other factors such as current registrant data and/or projected registrant data), and a time corresponding to a registration deadline (e.g. a countdown to the contest going "live," or a time of the registration deadline). Other information (e.g. contest relevant information) may be displayed in place of, or in addition to, any of the information shown in FIG. 2A, and any of the information shown in FIG. 2A may be omitted as appropriate. As can be seen in FIG. 2A, the contests C1 through C7 do not have many registrants relative to their registrant cap. The registrants are dispersed over the seven contests, even though each contest has significant capacity to include or register more registrants such that all registrants could be accommodated with a smaller number of contest.

A block figure showing computer resource allocation 204 is also shown in FIG. 2A. In some embodiments, the computer resource allocation 204 can represent the total resources the system has allocated to hosting contests. As shown in FIG. 2A, each of the contests C1-C7 utilize or consume certain amounts of computer resources, which are indicated by the respective blocks shown in FIG. 2A. The computer resource allocation 204 corresponds to resources allocated by the contest management system 206 to maintain and/or update the contests C1 through C7 (e.g. processing power, processing time, time on a cloud or otherwise remote computing system, or other computer resources). As can be seen in FIG. 2A, a "free" or available amount of computer resources is small relative to the resources required to maintain or update all seven contests. As such, if the contest management system 206 needs to create or generate additional contests, the contest management system 206 may not have sufficient computer resources to do so until additional computer resources are made available to the contest management system or contests utilizing existing computer resources are terminated and free up the computer resources they were consuming.

Figure 2B:
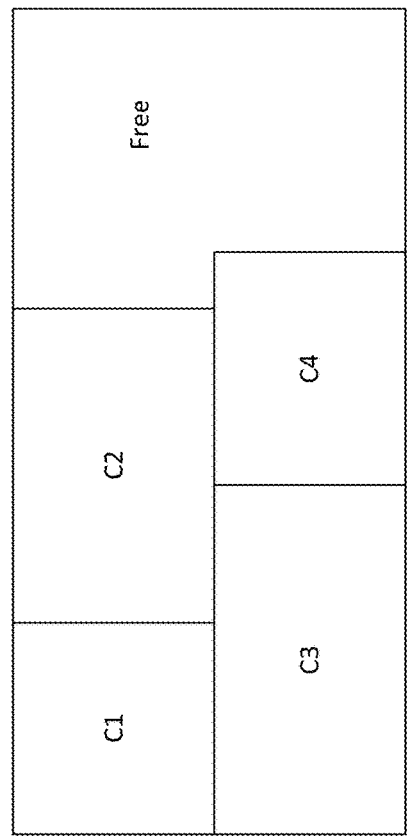
FIG. 2B depicts a contest lobby showing contests and a corresponding allocation of computer resources.

FIG. 2B shows a lobby 202 that includes contests C1 through C4. Contests for the lobby 202 shown in FIG. 2B are generated by a contest ranking system 302 (which can be included in the contest management system 206) as described herein. As can be seen in FIG. 2B, fewer contests are open for registration and as a result fewer computer resources are being utilized allowing the contest management system 206 sufficient computer resources to generate new contests. In addition to utilizing fewer computer resources, the total number of registrants in each contest, and the number of registrants as a percentage of the registrant cap of each contest, is increased as compared to the example shown in FIG. 2A. The increased number of registrations represents better computer resource utilization per registrant, enabling the contest management system to scale up without needing to increase the computer resources. As there is still room in each contest C1 through C4, further registrants can still be accommodated.

As can be seen in the computer resource allocation 204 shown in FIG. 2B, resources need only be allocated for four contests. Maintaining and updating each contest may have a cost in terms of computer resources, and by lowering the total number contests to be maintained or updated, computer resources can be preserved. The computer resource allocation 204 shown in FIG. 2B shows that there are more "free" computer resources than in the example shown in FIG. 2A, in which seven contests C1 through C7 were generated.

Figure 3:
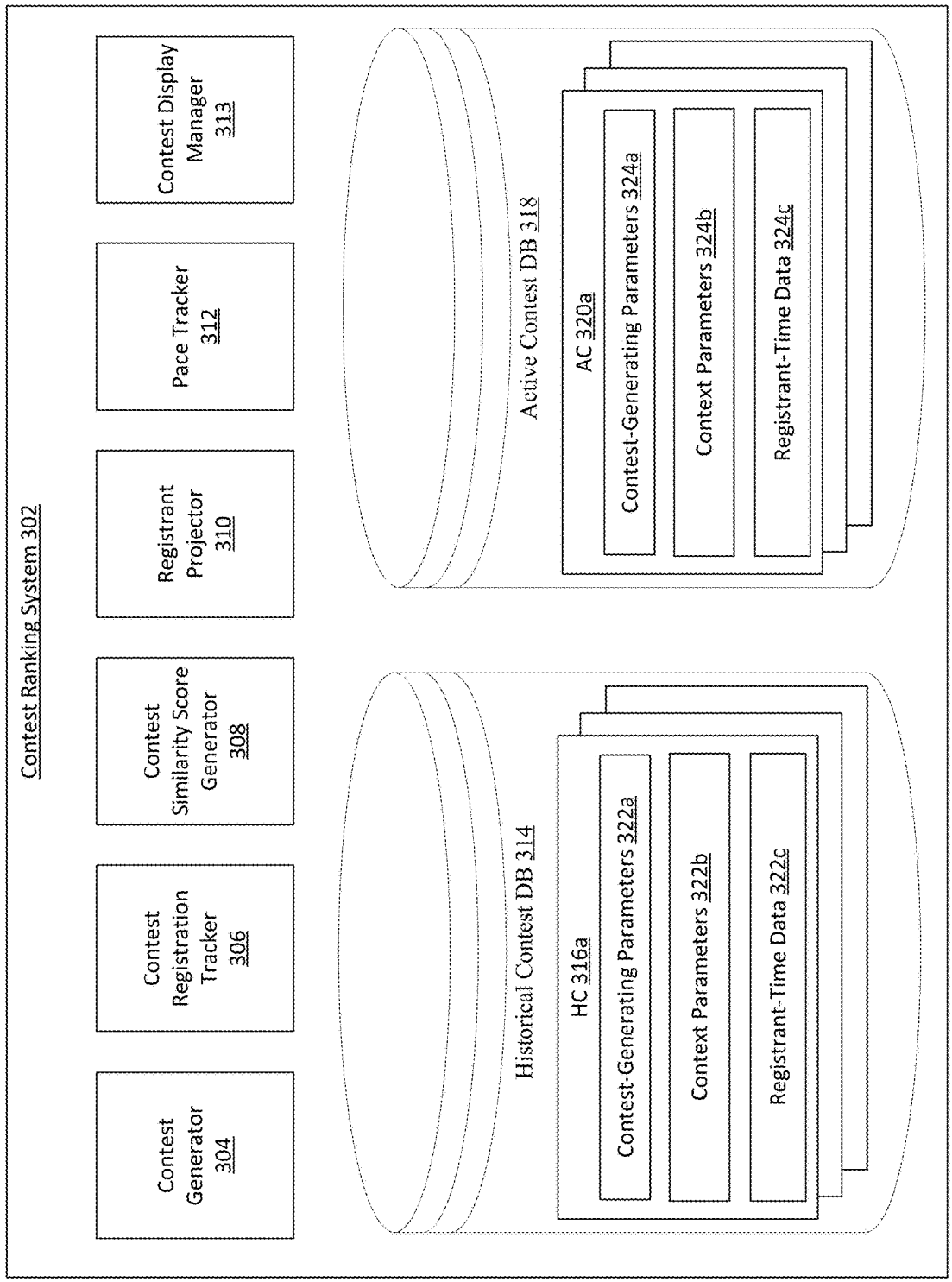
FIG. 3 is a block diagram depicting one or more embodiments of a contest ranking system.

FIG. 3 is a block diagram showing an embodiment of a contest ranking system 302. The contest ranking system 302 can be included in the contest management system 206 depicted in FIG. 1C. The contest ranking system 302 can include or be executed on one or more servers, such as the servers 106 shown in FIG. 1A. The contest ranking system 302 can include one or more applications, services, routines, servers, daemons, or other executable logics for generating a contest, including one or more of a contest generator 304, a contest registration tracker 306, a contest similarity score generator 308, a registrant projector 310, a pace tracker 312, and a contest display manager 313. The contest ranking system 302 can also include, access, maintain or manage one or more data structures, including but not limited to a historical contest database 314 (historical contest DB 314), and an active contest database 318 (active contest DB 318).

The contest generator 304 can include components, subsystems, modules, scripts, applications, or one or more sets of computer-executable instructions and can be configured to generate a contest. The contest generator 304 can be configured to generate a contest by generating a contest object based on one or more contest-generating parameter values. The contest-generating parameter values can include, for example, values for parameters including one or more of a league (e.g. NFL, MLB, NHL, NBA, a non-US league, or another sports organization), a game type (e.g. classic (with salary constraints) or pick'em (without salary constraints)), a registrant cap (e.g. a fixed cap, no cap, or a dynamic cap that changes based on demand or based on an instruction to change from another component, subsystem, module, script, or application of the contest ranking system 302), one or more games, a registration close time (e.g. a particular date and time, such as the date and time of the start of a first game of the contest), an entry fee, an eligibility specification requirement (e.g. a specification that only users having a certain experience level (e.g. as determined by a user profile) be permitted to enter the contest), a prize type (e.g. a satellite (a contest having a fixed number of entries to another contest as at least part of a prize pool), a super-satellite (a contest having a dynamic number of entries to another contest as at least part of a prize pool (e.g. the dynamic number based on number of registrants), or a normal prize type (including monetary prizes as at least part of a prize pool). The contest-generating parameter values can include any other appropriate parameter for generating a contest.

The contest generator 304 can be further configured to generate a contest at a particular timing or according to a schedule or based on upcoming games. For example, the contest generator 304 can be configured to generate one or more contests corresponding to an upcoming game, or corresponding to a set of games played on one or more days (e.g. on a particular day or in a particular week). The contest generator may be configured to generate a contest when an active contest hits its fixed registrant cap (has a number of registrants equal to a fixed registrant cap).

The contest generator 304 can be further configured to deviate from a schedule, or to generate a contest at a determined time, based on data received from another component, subsystem, module, script, or application of the contest ranking system 302. For example, the contest generator 304 can be configured to determine a time at which to generate a contest based on a pacing determined by the pace tracker 312 (e.g. a pacing of one or more active contests). The contest generator 304 can be configured to deviate from a schedule (e.g. to delay generation of a scheduled contest, or to restrict generation of a scheduled contest) based on a pacing determined by the pace tracker 312. The contest generator 304 can determine a timing for generating a new contest based on pacing information for more than one contest, and may weigh the pacing information based on features of the one or more contests (e.g. based on respective total numbers of registrants for the contests, and/or based on respective registrant caps for the contests). For example, as is described in more detail below with reference to the pace tracker 312, the pace tracker 312 may determine that one or more active contests are under-saturated (e.g. are below a projected or desired pace for the active contest, or below a projected or desired number of registrants). The contest generator 304 may be configured such that, based on or responsive to this determination, the contest generator 304 restricts generation of a scheduled contest.

The contest generator 304 may determine a time at which to generate a contest based on a policy for generating new contest. The policy may include a schedule for generating new contests including candidate times for generating a new contest. The policy may include one or more rules for determining, at one of the candidate times for generating a new contest, via the pace tracker 312 of the contest ranking system 302, whether one or more contests is under-saturated, and responsive to determining that the one or more contests is under-saturated, restricting generating a new contest at the one of the candidate times for generating a new contest. This can result in conserving computer resources by restricting the contest generator 304 from generating new contests when a number of currently active contests is determined to be sufficient to satisfy registrant needs.

The contest registrant tracker 306 can include components, subsystems, modules, scripts, applications, or one or more sets of computer-executable instructions and can be configured to track registrants for one or more contests. For example, the contest registrant tracker 306 may track, for each of one or more contests, how many users are registered for the respective active contest at a plurality of times. The contest registrant tracker 306 may maintain or reference a registrant profile that includes a plurality of time-registrant pairs for one or more contests. A registrant-time pair may include a pair of associated data that indicates a time and a corresponding number of registrants. The contest registrant tracker 306 may reference the active contest DB 318 to track registrants for active contests. The contest registrant tracker 306 may also determine registrant profile parameter values related to characteristics of registrant profiles for contests. Registrant profile data, for example, may be parametrized as registrant profile parameters (such as, for example, a maximum number of registrants, an integral of a number of registrants (e.g. between a first time and a second time), a number of registrants at a particular time (e.g. a time based on a time at which registration opened or a time based on a time at which registration closes), or parameters of a linear, exponential, or other function representing the registrant profile).

Figure 5:
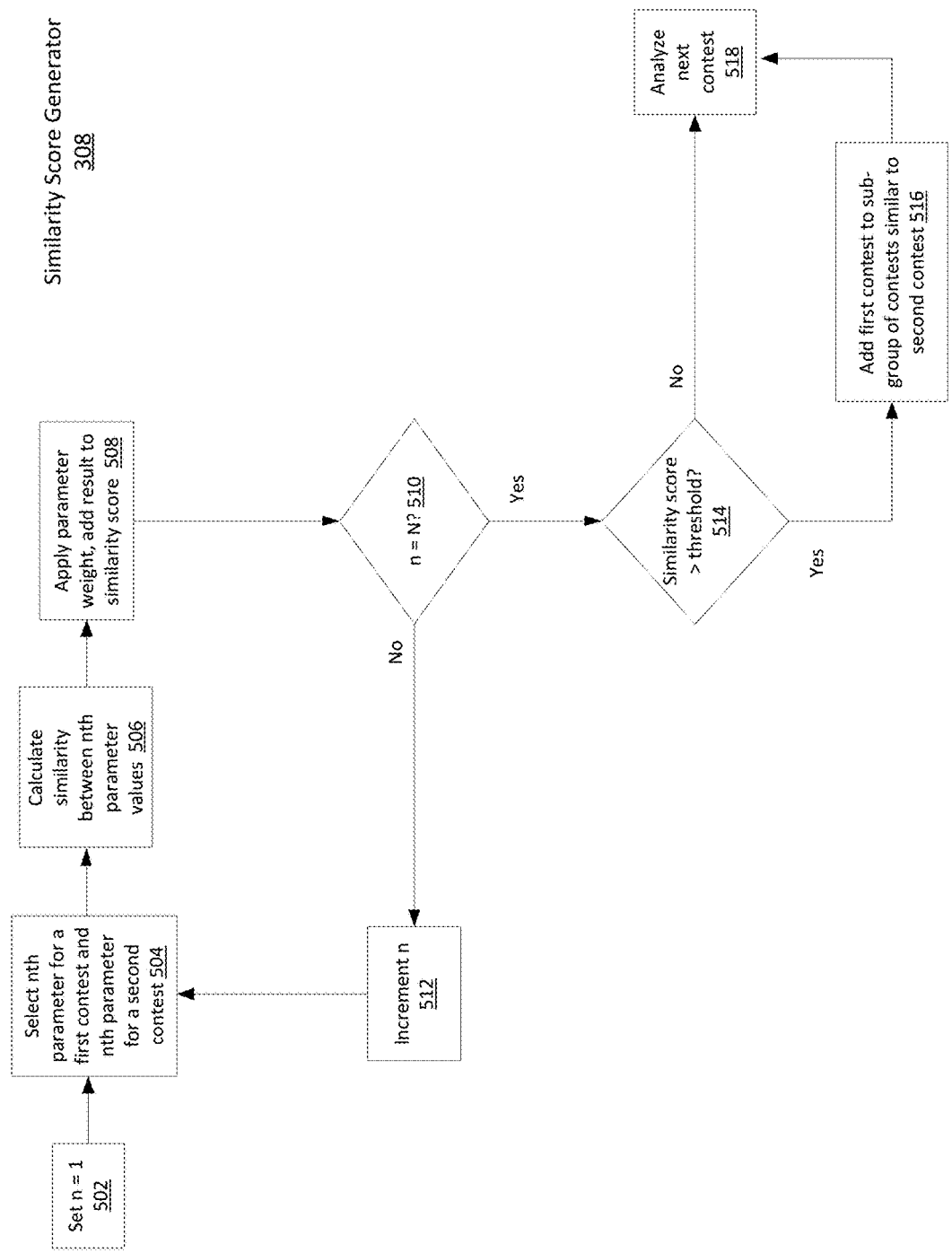
FIG. 5 is a flow chart depicting one or more embodiments of a process for determining one or more contests that are similar to a target contest.

The contest similarity score generator 308 can include components, subsystems, modules, scripts, applications, or one or more sets of computer-executable instructions and can be configured to generate a similarity score for a pair of contests, or a similarity score for a first contest and a set of one or more second contests. The contest similarity score generator 308 can determine a similarity score between a first contest and one or more second contests based on respective parameter values for parameters of the contests (e.g. contest-generating parameters of the contests and/or registrant profiles of the contests). The contest similarity score generator 308 can determine a similarity score based on determining a similarity between parameter values of parameters of the pair of contests as described herein with respect to FIG. 5. The contest similarity score generator 308 can determine the similarity score based on applying weights (e.g. pre-determined weights) to the determined similarity between parameter values. The contest similarity score generator 308 may determine a similarity score for each of a set of second contests relative to a first contest. The contest similarity score generator 308 may generate a subset of contests of the set of second contests (for which, for example, each contest of the subset of contests has a similarity score above a threshold, or for which the subset of contests includes a predetermined number of contests having the highest similarity score of the set of second contests). An example embodiment of the contest similarity score generator 308 generating a similarity score for each of a set of second contests relative to a first contest is shown in FIG. 5.

The registrant projector 310 can include components, subsystems, modules, scripts, applications, or one or more sets of computer-executable instructions and can be configured to generate a projection of a future number of registrants for a contest. The registrant projector 310 can determine one or more registrant-profile parameters for a contest. For example, the registrant projector 310 can determine one or more registrant-profile parameters for a target contest based on registrant-profile parameters of contests determined by the contest similarity score generator 308 to be similar to the target contest. The determined registrant-profile parameters for the target contest can be used to project a number of registrants for the target contest at a point in time between opening of registration and close of registration for the target contest. The registrant-profile parameters may include parameters for a linear equation that is a function of time that outputs a projected number of registrants at a given time. A "projection profile" can be a set of such outputs across a span of time.

In other embodiments, the registrant projector 310 need not determine registrant-profile parameters for the target contest. The registrant projector 310 can determine a projected number of registrants for the target contest at a point in time relative to opening of registration or close of registration based on a number of registrants at a corresponding point in time for one or more similar contests (e.g. determined to be similar by the contest similarity score generator 308).

The pace tracker 312 can include components, subsystems, modules, scripts, applications, or one or more sets of computer-executable instructions and can be configured to track a pace of a contest. The pace tracker 312 can determine a projected or desired number of registrants for a target contest at a particular time (e.g. a particular time relative to opening of registration or close of registration). The projected or desired number of registrants can be determined based on registrant data or a registrant profile for one or more contests similar to the target contest. The projected or desired number of registrants can be determined based on registrant-profile parameters determined for the target contest by the registrant projector 310.

The pace tracker 312 can determine a difference between a number of registrants for the target contest at a point in time (e.g. a current number of registrants) and the projected or desired number of registrants for the point in time. In this manner, the pace tracker 312 can determine if the target contest is below pace or above pace, and to what degree the target contest is below pace or above pace. The contest generator 304 can use this determination to determine a timing for generating a new contest. For example, if the target contest is below pace, the contest generator 304 may delay or restrict generating a new contest as described above. One or more embodiments of methods of using the pace tracker 312 are described herein with reference to FIG. 7A and FIG. 7B.

The pace tracker 312 can further rank contests based on respective pace statuses. For example, the pace tracker 312 can determine, for each contest of a plurality of contests, to what degree the contest is under-saturated or below pace (e.g. by how many participants the contest is below pace, or by a percentage difference between an "on pace" number of participants (e.g. the projected or desired number of participants) and the projected pace, either at the current time or at a future time (e.g. at close of registration)). The pace tracker 312 can determine a rank for each of the plurality of contests (or for a sub-set of the plurality of contests having being under-saturated or below pace to a degree that is equal to or greater than a threshold) based on the pace statuses. The pace tracker 312 can determine a high rank for a contests that is most under-saturated or below pace.

The contest display manager 313 can include components, subsystems, modules, scripts, applications, or one or more sets of computer-executable instructions and can be configured to manage display of a contest on a client device (such as a client 102). The contest display manager 313 can provide data corresponding to a layout of a contest display, such as a lobby 202 as shown in FIG. 2A.

The contest display manager 313 can determine a layout of the contest display that includes one or more predetermined locations for displaying contests based on projections or rankings determined by the pace tracker 312. For example, the contest display manager 313 can determine a layout that includes displaying, on a page or tab of the contest display, only contests that are below pace or that are below pace to a degree that is equal to or above a threshold, or displaying such below pace contests in a predetermined location (e.g. in a prominent position in the lobby, such as at the top or start of a list of contests), or can display such below-pace contests according to one or more features, such as a stylistic feature (e.g. a particular text style (which can specify a size, a font, underlining, bold, italics, or another style, and in some embodiments the particular text style is different than another style used in the contest display), a visual indicator associated with such below pace contests (e.g. a box, circle, or other visual indicator that surrounds or is otherwise positioned relative to the below pace contests), or any other appropriate feature.

The contest display manager 313 can determine a layout that includes prominently displaying (e.g. on a front page or tab of the display, or high up in a list of contests) contests based on a display score or a contest match score. The display score or match score may be determined by a contest recommendation system, such as the contest recommendation system 1002 described herein in reference to FIG. 7. The contest recommendation system 1002 may determine the display score or match score based on the projections or the rankings determined by the pace tracker 312 (e.g. may include an under-saturation score as a sub-score for a total contest match score). The contest display manager 313 may use rankings determined by the contest recommendation system 1002 to determine the layout for the contest display. Thus, a contest that is determined to be below pace may be displayed more prominently than would otherwise be the case.

The historical contest DB 314 can include one or more data structures that store one or more historical contests 316. A historical contest 316 can be a contest for which registration is closed. For example, the historical contest DB 314 can store a historical contest 316a, 316b, 316c, or more historical contests. The historical contest 316a can include data 322, including contest-generating parameters 322a, context parameters 322b, and registrant-time data 322c. Each of the historical contests stored in the historical contest DB 314 can include contest-generating parameters, context parameters, and registrant-time data. The historical contest DB 314 is described in more detail below with respect to FIG. 4A.

The active contest DB 318 can include one or more data structures that store one or more active contests 320. An active contest 320 can be a contest for which registration is open, or a contest for which registration has not yet opened. For example, the active contest DB 318 can store an active contest 320a, 320b, 320c, or more active contests. The active contest 320a can include data 324, including contest-generating parameters 324a, context parameters 324b, and registrant-time data 324c. Each of the active contests stored in the active contest DB 318 can include contest-generating parameters, context parameters, and registrant-time data. The active contest DB 318 is described in more detail below with respect to FIG. 4B.

Figure 4A:
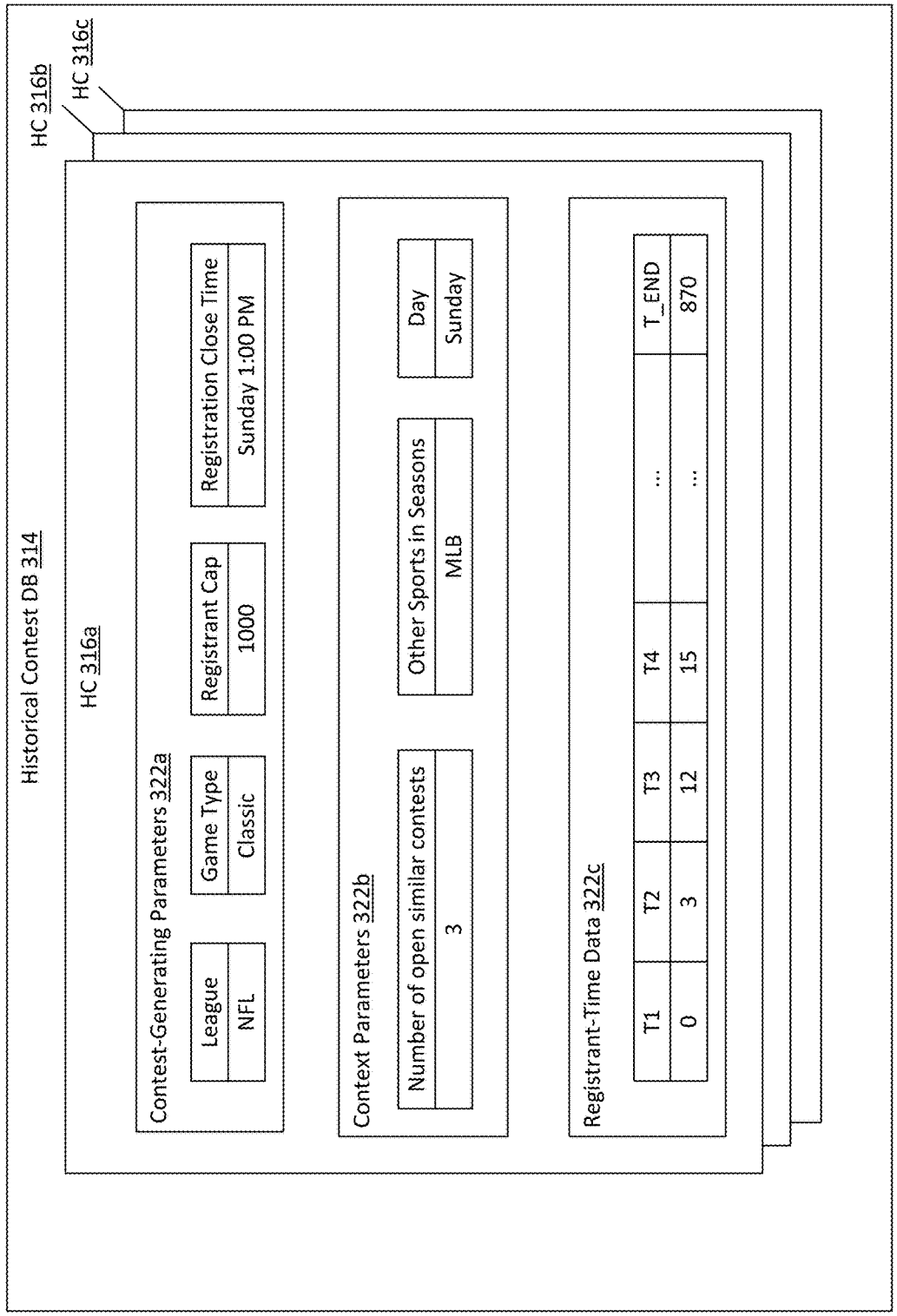
FIG. 4A is a block diagram depicting one or more embodiments of a historical contest database.

Referring now to FIG. 4A, FIG. 4A shows a historical contest DB 314 including a historical contest 316a, a historical contest 316b, and a historical contest 316c. The historical contest 316a includes data 322 including contest-generating parameters 322a, context parameters 322b, and registrant-time data 322c. The contest-generating parameters can be, or can be based on, any parameters used (e.g. by the contest generator 304) to generate the historical contest 316a. As described above, the contest-generating parameters can include, for example, one or more of a league, a game type, a registrant cap, one or more games, a registration close time, an entry fee, an eligibility specification requirement, a prize type, or any other parameters used for generating a contest.

The context parameters relate to a context for the historical contest 316a. The context can include, for example, whether sports other than the sport of the historical contest 316a were in season during the registration period of the historical contest 316a. If other sports were in session, the number of registrants for the historical contest 316a may have been depressed, and using a context parameter related to this to account for such information (e.g. by the registrant projector 310) would be useful. Another context parameter may indicate, for example, a day of the week on which registration for the historical contest 316a closed, or whether registration for the historical contest 316a closed on a weekend or on a weekday.

The context parameters can also relate to information related to other contests, such as a number of contests running concurrently with, or in close temporal proximity to (e.g. within one hour of, within 2 hours of, within 5 hours of, within one day of, within two days of, or within a week of) the historical contest 316a. Running concurrently with, or in close temporal proximity to, the historical contest 316a can refer to contests that have an overlapping registration period, or that have registration periods that are separated by a small amount of time (such as one hour, 2 hours, 5 hours, one day, two days, or one week). For example, such context parameters can include an average number of concurrent active contests during the registration period of the historical contest 316a, or an average number of concurrent active contests during a time period of interest within the registration period of the historical contest 316a (e.g. within the last hour of registration of the historical contest 316a, or at close of registration). These averages may be averages of contests determined to be similar to the historical contest 316a by the contest similarity score generator 308. Another context parameter may be an indicator of a number of registrants of contests running concurrently with, or in close temporal proximity to, the historical contest 316a.

The historical contest 316a further includes registrant-time data 324c. The registrant-time data 324c can include time—number-of-registrant pairs (pairs of associated data) indicating a number of registrants at a plurality of times T1 through T_END. T1 may correspond to a time at which registration of the historical contest 316a opened, and time T_END may correspond to a time at which registration of the historical contest 316a closed. The registrant-time data 324c may also include registrant profile parameters for the historical contest 316a.

Figure 4B:
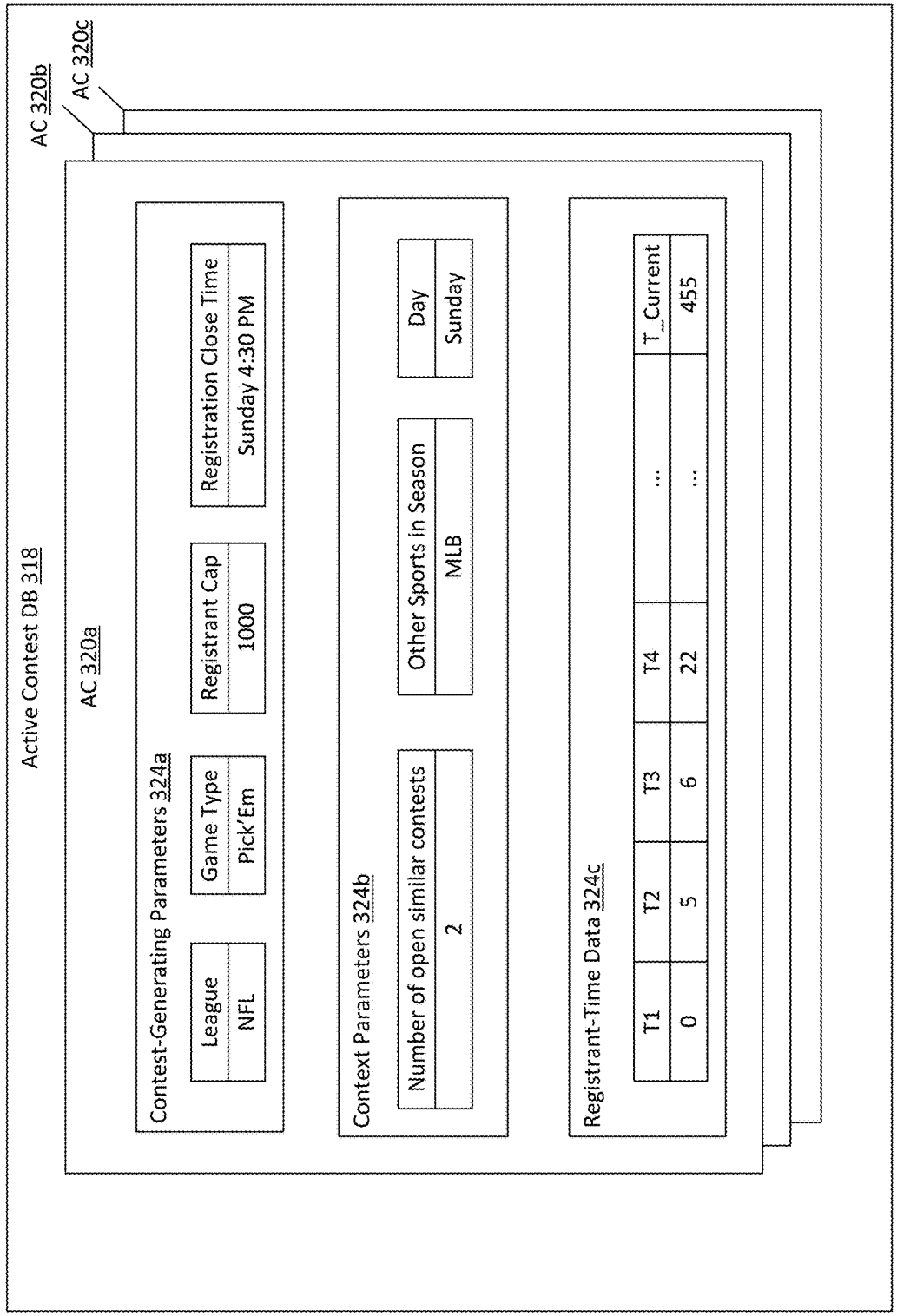
FIG. 4B is a block diagram depicting one or more embodiments of an active contest database.

Referring now to FIG. 4B, FIG. 4B shows an active contest DB 318 including an active contest 320a, an active contest 320b, and an active contest 320c. The active contest 320a include contest-generating parameters 324a, context parameters 324b, and registrant-time data 324c. The active contest DB 318 may include contests for which registration is currently open, or contests for which registration has not yet begun (and may not yet be presented in the lobby 202). The contest-generating parameters 324a, context parameters 324b, and registrant-time data 324c may be similar to the contest-generating parameters 322a, context parameters 322b, and registrant-time data 322c of the historical contest 316a, except that the registrant-time data 322c of the active contest 320a may only include time—number-of-registrant pairs up to a current time (T_Current), rather than up to T_END, as registration has not yet closed for the active contest 320a.

Referring now to FIG. 5, FIG. 5 shows an example embodiment of a process for generating a similarity score between a first contest and a second contest. This can be used to determine a set of first contests that are similar to a second (target) contest, and the registrant projector 310 can perform analysis using the set of similar first contests to project a number of registrants for the second contest, as described herein. The process can be performed by the contest similarity score generator 308. In a brief overview, the contest similarity score generator 308 can set a parameter index "n" to one, or some initial value (BLOCK 502). The contest similarity score generator 308 can select an nth parameter for a first contest (e.g. a historical or active contest), and an nth parameter for a second contest (e.g. a target contest) (BLOCK 504). The contest similarity score generator 308 can calculate a similarity between the parameter values of the nth parameter for the first contest and the nth parameter for the second contest (BLOCK 506). The contest similarity score generator 308 can apply a parameter weight to the calculated similarity, and can add the result to a total similarity score (BLOCK 508). The contest similarity score generator 308 can determine whether the index n is equal to N (a total number of parameters being considered by the contest similarity score generator 308) (BLOCK 510).

If the contest similarity score generator 308 determines that the index n is not equal to N, the process proceeds to BLOCK 512, and the contest similarity score generator 308 can then increment n, and the process can proceed to BLOCK 504. If the contest similarity score generator 308 determines that the index n is equal to N, the process proceeds to BLOCK 514, and the contest similarity score generator 308 can determine whether the similarity score is less than (or, in other embodiments, equal to) a threshold, such as a pre-determined threshold. If the contest similarity score generator 308 determines that the similarity score is below the threshold, the process proceeds to BLOCK 516, and the first contest is added to a sub-group of contests (a sub-group of the contests being analyzed) that are similar to the second (target) contest. The process then proceeds to BLOCK 518, and a next contest is analyzed for similarity with respect to the second contest, or the process may end. If, at BLOCK 514, the contest similarity score generator 308 determines that the similarity score is not below the threshold, the process proceeds directly to BLOCK 518, or ends.

In more detail, at BLOCK 504, the contest similarity score generator 308 can select an nth parameter of a first contest (e.g. a historical contest). The nth parameter may be any of the contest parameters described herein, such as, for example, a contest-generating parameter or a context parameter. The nth parameter may be a registrant profile parameter. The contest similarity score generator 308 may further select an nth parameter of a second contest. The nth parameter may correspond to the nth parameter of the first contest (e.g. may be the same parameter).

At BLOCK 506, the contest similarity score generator 308 may calculate a similarity between the value for the nth parameter of the first contest and the value for the nth parameter of the second contest. This similarity may be based on a direct similarity (e.g. if the parameter is an entry fee, the similarity may correspond to a difference between the respective entry fees of the first contest and the second contest), or may be a similarity determined in some other manner, such as by reference to a look-up table (LUT). The LUT may be accessible to the contest similarity score generator 308, and may describe a number of "similarity points" that correspond to parameter value pairs for particular parameters. For example, if the parameter is a day of the week, and the first parameter value correspond to Saturday and the second parameter value corresponds to Sunday, the LUT may indicate that a first number of similarity points corresponds to this difference in parameter values for the day-of-the-week parameter. If the first parameter value correspond to Wednesday and the second parameter value corresponds to Sunday, the LUT may indicate that a second number of similarity points smaller than the first number corresponds to this difference in parameter values for the day-of-the-week parameter, indicating a greater similarity between a Saturday-Sunday pair than between a Wednesday-Sunday pair. Parameter values may correspond to parameter value groups (e.g. to a "small entry fee" group, or to a "large entry fee" group), and similarities between corresponding groups may be determined rather than directly determining similarities between the parameter values.

At BLOCK 508, the contest similarity score generator 308 may apply a weight corresponding to the nth parameter to the similarity (e.g. to the similarity points) calculated at BLOCK 506. The weight may be, for example, a predetermined weight. The weight may be a weight determined by a machine learning algorithm trained on a set of contests (e.g. a set of contests including annotations indicating similarity between the contests). This can provide for weighing parameter value similarities according to the importance of the corresponding parameter, and can provide for an improved method of generating a similarity score.

As described above, at BLOCKs 514-516, the contest similarity score generator 308 may determine that a similarity score is greater than a pre-determined threshold, and responsive to this determination may assign the first contest to a sub-group, the sub-group including contests similar to the second contest. This sub-group of contests similar to the second contest can be used in subsequent analysis, as described herein. Using the sub-group of similar contests, rather than analyzing every contest for which data is stored, can provide for more efficient and less computer-resource-intensive analysis. For example, the registrant projector 310 may perform analysis on the group of contests to generate a projected number of registrants for the second contest. By limiting the analysis to only those contests that are similar to the second contest and omitting other contests, the registrant projector 310 may use less computing resources to perform the analysis.

C. Systems and Methods for Generating a Multidimensional User Vector Based on Fantasy Sports Account Activity The following description relates to one or more systems and methods for generating a multidimensional data structure (e.g., user vector) based on fantasy sports account activity for a user of a fantasy sports platform. A vector management system can be configured to use such multidimensional data structures to select and/or generate content for users of the fantasy sports platform. In addition, the vector management system can utilize the multidimensional data structures to provide recommendations to users based on their fantasy sports account activity. Moreover, the vector management system can utilize the multidimensional data structures to provide personalized experiences to users, for instance, providing personalized lobbies based on the contests they are most likely to participate in based on the type of sport, the entry fee of the contest, the current or maximum number of registrants, the day of the week, among others.

The present disclosure can also use the multidimensional data structures generated by vector management system to identify similar users and to provide recommendations based on the activity of other users. In some embodiments, the vector management system can be configured to generate user clusters that include subsets of the data structures that are determined to be similar to one another. The vector management system can then provide content or recommendations based on the activities and/or responses of other users that have user vectors that are included in the same user cluster.

As will be described herein, the multidimensional user vector of a user generated by the vector management system can be used to identify similarities between multiple user profiles based in part on attributes of player lineups in the respective user's profile and/or one or more contests (e.g., fantasy contests) the respective user has participated in. The vector management system can correlate the similarities between the user profiles, based on their respective multidimensional user vectors, to provide for optimization of the content provided to each of the plurality of users. For example, the content management system 206 can identify contests that a user is more likely to be interested in and participate in based on a similarity between the user's multidimensional user vector and the multidimensional user vectors of other users.

Figure 6A:
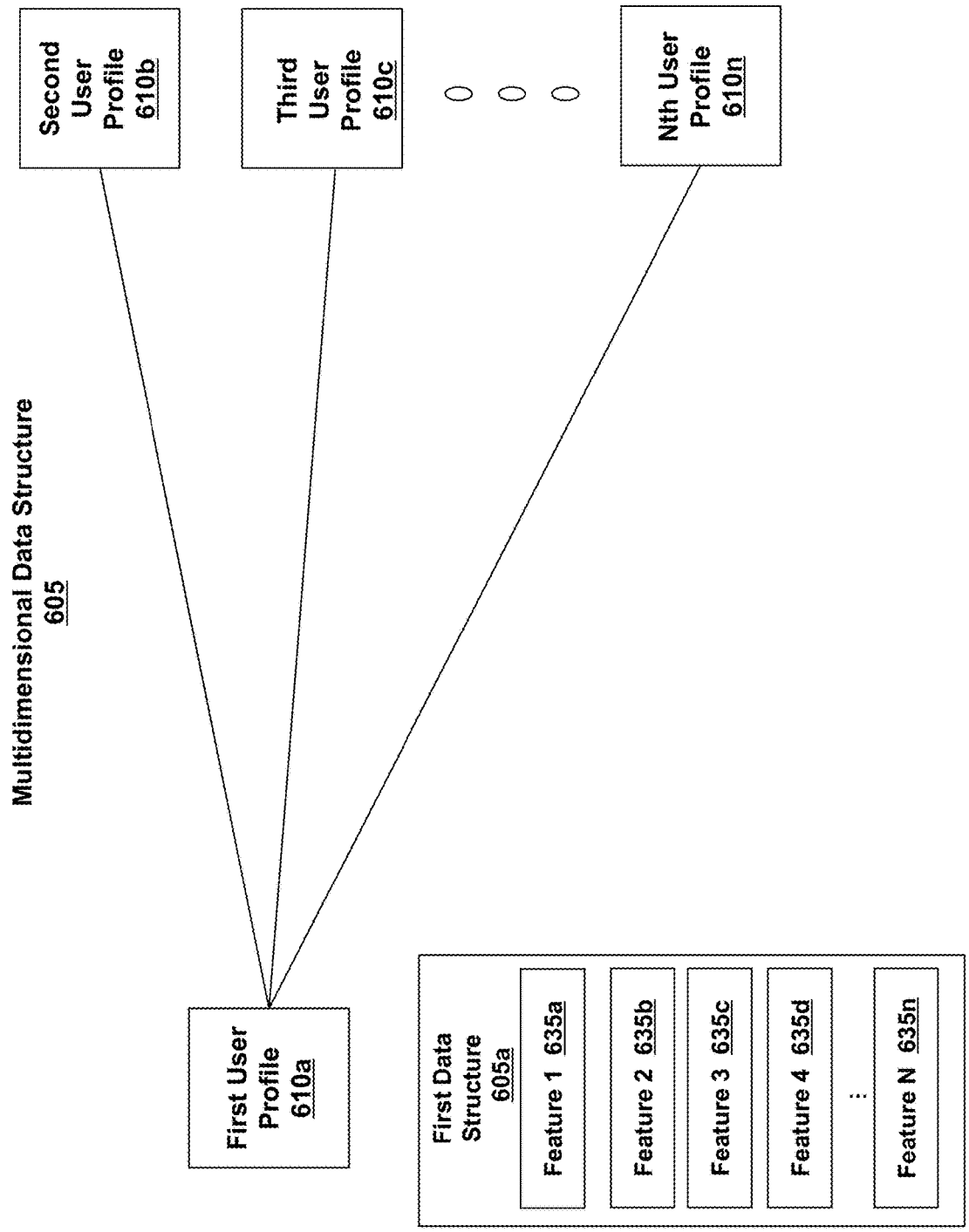
FIG. 6A depicts one or more embodiments of a multidimensional data structure linking a first user profile of a plurality of user profiles.

Now referring to FIG. 6A, FIG. 6A shows a block diagram identifying a plurality of user profiles 610a-n and a multidimensional data structure 605 (hereinafter "data structure 605"). In embodiments, the multidimensional data structure 605 can include or correspond to a multidimensional user vector or a user vector. The first user profile 610 can correspond to a first user of a fantasy sports platform, which can be executed by one or more processors. Each user profile can correspond to a respective user of the fantasy sports platform.

In the illustrative embodiment of FIG. 6A, the data structure 605 can be a first data structure 605 generated based on the first user profile 610a. The first data structure 605 includes one or more features 635a-635n. The features 635a-635n correspond to player attributes, contest attributes or a combination of both associated with each user profile linked in the data structure 605. The features 635a-635n can include a user behavior metric 650 (e.g., user behavior metric 650 of FIG. 6B). The user behavior metric 650 can include a value generated based on a data from a previous contest a user profile 610 participated in, a past performance of one or more fantasy lineups of the user profile 610 in one or more previous contests, or selections made by the user profile 610 in one or more previous contests. In some embodiments, the user behavior metric 650 can include an association between a user behavior in a previous contest and at least one player attribute, at least one contest attribute or a combination of one or more player attributes and/or one or more contest attributes. For example, in one embodiment, the user behavior metric 650 can include an association between the user profile 610 and an entry fee for at least one previous contest the user profile 610 participated in. The user behavior metric 650 can include an association between the user profile 610 and a sport type (e.g., football contest, baseball contest, NASCAR contest) of at least one previous contest the user profile 610 participated in. The user behavior metric 650 can include an association between the user profile 610, a contest attribute (e.g., entry fee, sport type, duration) and a frequency of or a commonality of the respective contest attribute. For example, in one embodiments, the user behavior metric 650 can identify a unique, rare or uncommon contest type that the respective user profile 610 has previously participated in.

The player attributes can include one or more of the following: a name, a sport category, a location, a team value, a position value, a price parameter or one or more future contests specific to the respective player. The contest attributes can include one or more of the following: a sport category, a price parameter, a prize parameter, a registrant threshold, a registrant limit, a current registrant count, a day value, a time value, a duration value, a contest type, and an experience level. In addition, the features 635a-635n can correspond to other attributes associated with a user profile, such as a user device associated with the profile, geographical location associated with the profile, preferences associated with the profile, activities associated with the profile, interests associated with the profile, among others. The features 635 can be based on activity that can be detected by an application executing on the user device associated with the profile, including responses to notifications provided to the user device, content provided to the user device and other activity performed on the user device.

Each of the features 635a-635n can be assigned a value that can be determined in part on a frequency value indicating a frequency that the respective feature appears in the user profiles linked in the first data structure 605. For example, a first player attribute can correspond to the first feature 635a and the first player attribute may include a location or team (e.g., Boston professional teams) that a particular player on a player lineup in the first user profile 1530 plays for. In an embodiment, six player lineups included in the first user profile may include players from the same Boston team, thus, the first feature 635a can be assigned a value of six. Each of the other features 635b-635n can correspond to different player attributes, contest attributes or a combination of both associated the user profile corresponding to the first data structure 605a.

The multidimensional data structure 605 can be computed based on the values of each feature 635a-635n. The vector management system 800 can assign different weights to each feature 635 such that certain features may more importance than others when determining an impact of the multidimensional user vector. For example, the user behavior metric can be used to modify a player attribute or a contest attribute to generate at least one feature 635 for a data structure 605. In embodiments, a feature 635 can include a player attribute or contest attribute modified based on the associated between the respective player attribute or contest attribute and the user profile 610 to form a weighted player attribute or weighted contest attribute. The player attribute or contest attribute can be weighted based on a frequency the user profile.

In one embodiment, a player attribute can be weighted based on a frequency the user profile 610 used or selected players having the respective player attribute (e.g., common team, common position). In one embodiment, a contest attribute can be weighted based on a frequency the user profile 610 participated in contest having the respective contest attribute (e.g., contest duration, sport type, value of entry fee). In some embodiments, a higher weighed value can correspond to a higher frequency and a lower weighted value can correspond to a lower frequency. In embodiments, a higher weighed value can correspond to a lower frequency (e.g., 10 corresponds to a least favorite or uncommon choice) and a lower weighted value can correspond to a higher frequency (e.g., 1 corresponds to a favorite or most common choice).

The first data structure 605 can be generated by a vector management system (e.g., vector management system 800 of FIG. 8) using be enhanced, modified or otherwise updated using a clustering algorithm. The vector management system 800 can implement the clustering algorithm to identify user profiles that are similar, such as but not limited to, by comparing the player lineups of user profiles, contests that the users are participating in, geographical information associated with the user profile, online activity monitored via the application of the content management system, among others. In some embodiments, the vector management system 800 can use the clustering algorithm to generate a plurality of user clusters. Each user cluster can include a plurality of user data structures 605 (e.g., user vectors) corresponding to particular user profiles 610. It should be appreciated that one or more known clustering techniques can be used to generate user clusters based on a distance between respective multidimensional data structures 605 of user profiles 610. It should be appreciated that one or more known clustering techniques can be used to generate user clusters based on an association or commonality between respective multidimensional data structures 605 of user profiles 610. The clustering algorithm can generate statistics on each of the user profiles and their respective attributes (e.g., user behavior metrics, player profile attributes, contest attributes) to group user profiles to one or more user clusters. The statistics can include the historical data included in the activity profiles of the user profiles, the player attributes included in the player lineups in the user profiles and the contest attributes for contests associated with the user profiles.

Now referring to FIG. 6B, a data structure 605 having a features 635a-635n with a user behavior metric 650 applied to the respective feature 635. The user behavior metric 650 can correspond to a frequency or affinity of the respective attribute to other attributes included with or associated with the user profile 610. For example, a first feature 635a can include a player attribute corresponding a team the respective player plays for. The team of the player can correspond to a local team or a favorite team of a user associated with the user profile 610. For example, in some embodiments, the user profile 610 can include many players from the same team as the first feature 635a. Thus, the first feature 635a can be give a user behavior metric of 1 indicating a highest frequency (e.g., most players are from this team) or the user profile 610 selects players from this team the most often as compared to other players selected for one or more fantasy sports lineups of the user profile 610.

In embodiments, a second feature 635b can include a player attribute corresponding a position the respective player plays. The position of the player can correspond to at least one position on a team the player plays on, such as but not limited to, a quarterback for a football team, pitcher for a baseball team or center for a basketball team. In some embodiments, the user profile 610 can include a few players that play the same position as from the same team as the first feature 635a. Thus, the second feature 635a can be give a user behavior metric of 3 indicating a middle or less than middle frequency as compared to positons of other players selected for one or more fantasy sports lineups of the user profile 610.

In embodiments, a third feature 635c can include a contest attribute corresponding a sport type (e.g., football, baseball, NASCAR) of the respective contest. In one embodiment, the third feature 635c can correspond to a contest attribute, here a type of sport, that the user profile 610 does not typically participate in. The third feature 635c can correspond to a type of sport that the user profile 610 participates in less than an average value of the total number of contests the user profile 610 participates in. Thus, the third feature 635c can be give a user behavior metric of 3 indicating a less than average frequency as compared to other types of contests the user profile 610 participates in.

In embodiments, a fourth feature 635d can include a contest attribute corresponding an entry fee (e.g., value of entry fee, size of entry fee) of at least one contest. The entry fee can be grouped into a range of values or be used a distinct value. In one embodiment, the fourth feature 635d can correspond to an entry fee that is within a range of values common to a majority of the contests the user profile 610 typically participates in. For example, the fourth feature 635d can correspond to an entry fee that falls within a range of values that correspond to entry fees for a high frequency of contests the user profile 610 participates in. Thus, the fourth feature 635d can be give a user behavior metric of 2 indicating a higher than average frequency as compared to the entry fees of other contests the user profile 610 participates in.

The user behavior metrics can be weighted against or in comparison to each of the attributes included within the user profile 610. For example, the team player attribute can be weighted as compared to the position player attribute, the sport type contest attribute, and/or the entry fee contest attribute. The user behavior metrics can be weighted against or in comparison to each of the attributes of the same category. For example, the team player attribute can be weighted as compared to the position player attribute, and/or one or more additional player attributes. The user behavior metrics can be weighted against or in comparison to attributes of the same type. For example, the team player attribute can be weighted as compared to the teams represented by other players included within one or more fantasy sports lineups of the user profile 610.

Figure 7:
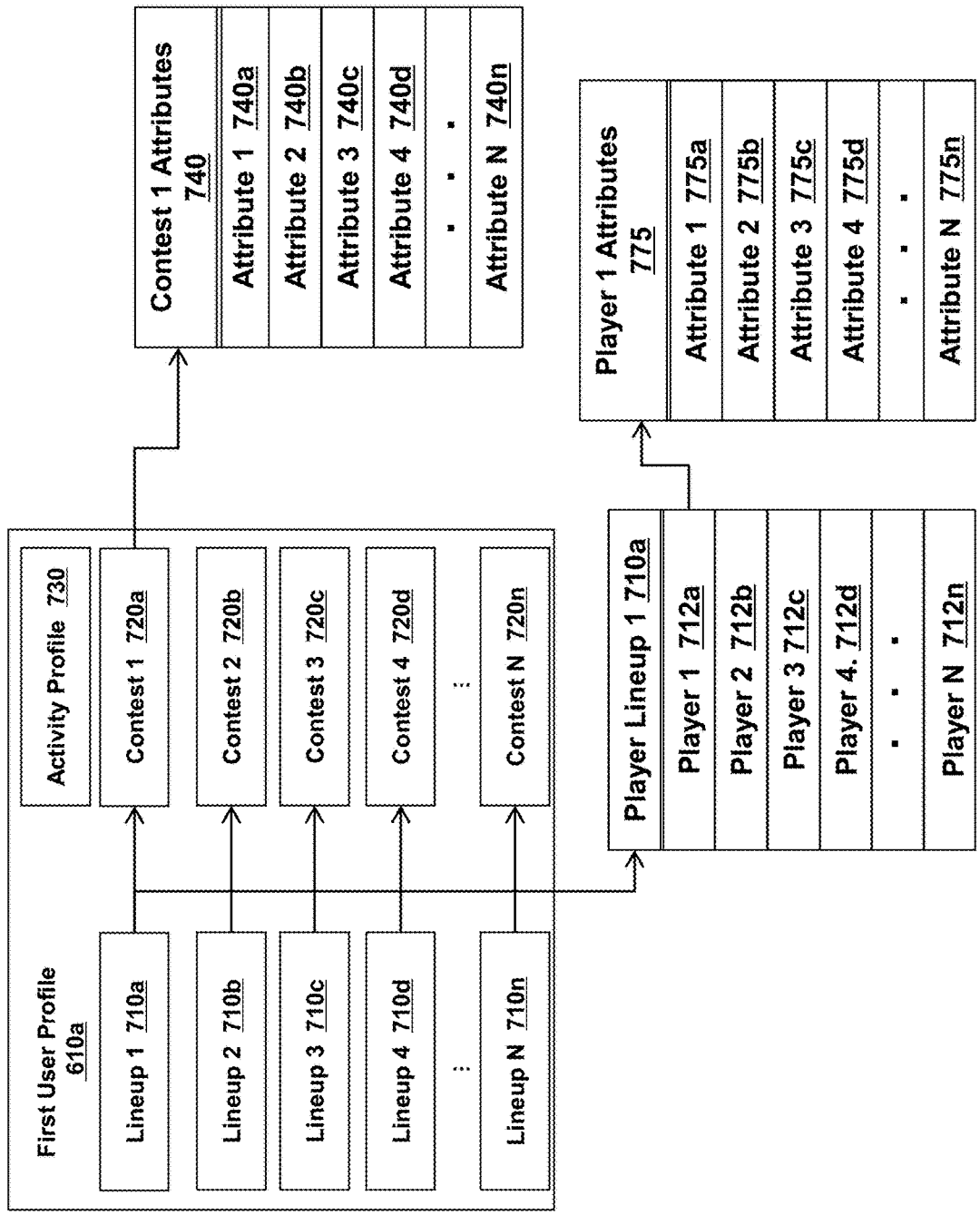
FIG. 7 depicts one or more embodiments of the first user profile of FIG. 6A including player attributes and contest attributes associated with the first user profile.

Now referring to FIG. 7, the first user profile 610a is illustrated having one or more lineups (e.g., player lineups) 710a-710n, one or more contests 720a-720n and an activity profile 730. The lineups 710a-710n may include player lineups, such as but not limited to, fantasy sports lineups. Each of the lineups 710a-710n can be created for a particular contest and can include one or more players selected by the user for the particular contest. The lineups 710a-710n can include previous lineups (or inactive lineups) for past contests that have closed or have otherwise been completed, active lineups for active contests or lineups for future contests. In some embodiments, the lineups 710a-710n may include lineups, such as but not limited to, for online gambling sites. The lineups 710a-710n may be the same as or substantially similar to lineup 1012c described above with respect to FIG. 7. The contests 720a-720n can include any contest described herein, such as but not limited to, one or more fantasy sports contests.

Each of the lineups 710a-710n can be associated with one or more contests 720a-720n. For example, each of the lineups 710a-710n can be generated by a user for a particular contests 720a-720n. In some embodiments, the lineups 710a-710n can be used in multiple contests 720a-720n. The lineups 710a-710n may include a list of players the user selected for the particular contest 720a-720n. The number of players included in a respective one of the lineups 710a-720n can vary and can be based at least in part on the parameters of the particular contest 720a-720n. FIG. 7 shows a detailed player lineup for the first lineup 710a, however the remaining lineups 710b-710n may include similar player lineups having one or more players.

The players 712a-712n can include one or more player attributes 775a-775n. As stated above, the player attributes 775a-775n can include characteristics of the particular player, such as but not limited to a name, a sport category, a location, a team value, a position value, a price parameter or one or more future contests specific to the respective player. In addition, the player attributes can include statistical information about performances of the player. The player attributes can include additional information relating to injuries of the player, projected performance of the player against a given opponent, as well as any other information that may be determined by the system. The player attributes can also include correlations to statistics associated with the player's team as well as other teammates of the player or players on an opposing team of the player.

Each of the contests 720a-720n can include one or more contest attributes 740a-740n corresponding to parameters, entry data, requirements, or any combination of them. For example, the contest attributes can include one or more of the following: a sport category, a price parameter, a prize parameter, a registrant threshold, a registrant limit, a current registrant count, a day value, a time value, a duration value, a contest type, and an experience level. The number of attributes 740a-740n for a contest 720a-720n can vary and be based at least in part on the parameters, entry data, or requirements of the particular contest.

The activity profile 730 can include a listing of previous contests the user has participated in. For example, the activity profile 730 can include data corresponding to user interactions with one or more fantasy sports contests executing on a device associated with the respective user. The activity profile can be used to determine a type of user based on the activity profile of the user. For instance, depending on the number of contests the user enters or the frequency at which the user is participating in contests or accessing the application, the system can determine whether the respective user profile is a casual fantasy sports player or a serious fantasy sports player. In some embodiments, the system can store predetermined threshold values with which to compare a user's activity profile to determine the type of user a particular user is.

In some embodiments, the activity profile 730 can be used to determine one or more user behavior metrics 650 for the user profile 610 and associations between at least player attribute and the at least one contest attribute. The activity profile 730 can identify common or most frequency profile attributes and/or contest attributes associated with a user profile 610. The activity profile 730 can be used to determine how often a user profile 610 participates in certain types of contests and the attributes of the respective contests. In one embodiments, the activity profile 730 can be used to identify that the user profile 610 participates in contests that are daily more frequently than contests that are monthly. A user behavior metric 650 can be generated using the activity profile 730 to weight daily contests greater for the user profile 610 as compared to monthly contests. The activity profile 730 can be used to determine how often a user profile 610 uses or selects players having certain types of player attributes. In one embodiments, the activity profile 730 can be used to identify that the user profile 610 selects players from one team as compared other possible teams available to select players. A user behavior metric 650 can be generated using the activity profile 730 to weight players from that respective higher for the user profile 610 as compared to the players from the other possible teams available to select players.

Figure 8:
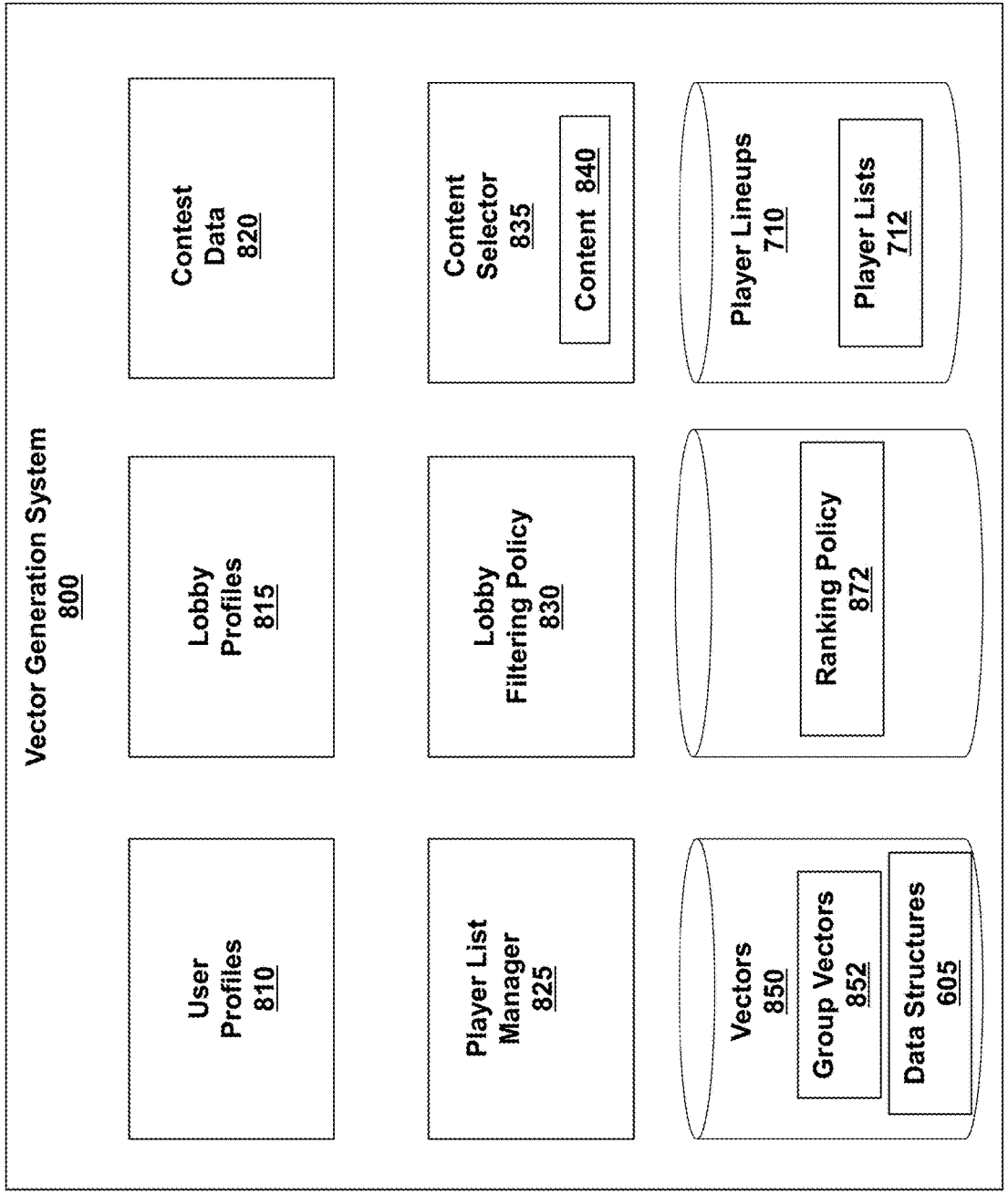
FIG. 8 depicts one or more embodiments of a block diagram of a vector management system.

Now referring to FIG. 8, a block diagram depicting an embodiment of the vector management system 800 is shown. The vector management system 800 can include or be executed on one or more servers, such as the servers 106 shown in FIG. 1A. The vector management system 800 can be a part of or include the content management system 200 described herein. The vector management system 800 can include one or more user profile manager 810, user cluster manager 815, contest data manager 820, a player list manager 825, a lobby manager 830, and a content selector 835. The vector management system 800 can also include, access, maintain or manage one or more data structures, including but not limited to a vectors 850, and a user profiles data structure 605. The vectors 850 can store one or more user clusters 852 and one or more data structures 605a-n. The user profiles data structure 605 can store one or more user profiles 610a-n corresponding to users of the fantasy sports platform. The user profiles 610a-n can include player lineups 710a-n generated for one or more contests 720a-n in which the user submitted a player lineup 710 and an activity profile 730 of the user including information relating to usage of the application executing on a client device as well as other information obtained by the fantasy sports platform via interactions with the user through application, browser, or other data sources to which the fantasy sports platform has access.

The user profile manager 810 can comprise components, subsystems, modules, scripts or one or more sets of computer-executable instructions and can be configured to identify and store user profiles 610a-n created, registered and/or used to enter one or more contests. The user profile manager 810 can manage completed user profiles and incomplete user profiles (e.g., user profiles missing data). The user profile manager 810 can generate user profiles, such as the user profile 610*a*. The user profile manager 810 can access, from a plurality of databases and other data sources, one or more attributes associated with one or more players included in player lineups 710*a* generated by the user and included in the user profile 610*a*. In addition, the user profile manager 810 can access, from a plurality of databases and other data sources, one or more attributes associated with one or more contests 720*a-n* for which the user submitted one or more player lineups 710*a*. The user profile manager can also use activity information from an activity profile 730 that can include any information accessible to the user profile manager 810 that the user has provided or otherwise helped the vector management system 800 generate or otherwise acquire.

The user profile manager 810 can be configured to generate a user vector for each user profile 610 based on the lineups 710, contests 720 and activity profile 730 associated with the user profile 610. The user vector can include multiple features. Each feature can include a feature value providing an indication of a strength of a particular feature based on the user's profile 610. The user profile manager 810 can generate one or more features for a user vector based on player attributes 775 of the players 712 include in each player lineup 710.

The contest data manager 820 can comprise components, subsystems, modules, scripts or one or more sets of computer-executable instructions and can be configured to store data corresponding to one or more contests, including but not limited to, contest attributes. The contest data manager 820 can include a sport category, a price parameter, a prize parameter, a registrant threshold, a registrant limit, a current registrant count, a day value, a time value, a duration value, a contest type, and an experience level required for a particular contest. The contest data manager 820 may include data corresponding to previous contests, active contests or future contests.

The player list manager 825 can comprise components, subsystems, modules, scripts or one or more sets of computer-executable instructions and can be configured to manage player lists for users of the vector management system 800. The player list manager 800 can be configured to access accounts of users and/or the user profiles 610 of the vector management system 800. In some embodiments, the accounts of users can be linked to the user profiles 610.

The player list manager 825 is configured to maintain, for each user, one or more player lineups 710. The player lineups 710 can include a list of all of the players that the user has selected in one or more lineups for one or more contests. The player list manager 825 can be configured to receive updates and modifications to the player lineups 710 including statistics about each player included in the player lineups. In addition, the player list manager 825 can include information about a value assigned to each player as well as a number of fantasy points assigned to each player based on the player's in-game performance.

In some embodiments, the player list manager 825 can be configured to establish a web socket connection with one or more servers of one or more fantasy sports systems and be configured to receive activity updates of the users. In some embodiments, the vector management system 800 may identify a user's account at the fantasy sports system and link the respective accounts of the user. As described herein, the vector management system 800 can include or be part of a content management system or the fantasy sports platform, and as such, may be configured to receive and access data generated by or otherwise accessible to the content management system or the fantasy sports platform. In this way, lineup changes, additions, or deletions made in an account of a user of the fantasy sports system can be provided to the vector management system 800, thereby allowing the vector management system 800, or the player list manager 825, to update the player lineups 710*a-n* of user profiles 610.

The player list manager 825 can be configured to receive, for a user of the vector management system 800, from a fantasy sports system, a communication identifying a fantasy lineup and an account of the user maintained by the fantasy sports system. The player list manager 825 can use the account of the user maintained by the fantasy sports system to identify the corresponding account of the user maintained by the vector management system 800 to which the account of the user of the fantasy sports system is linked. The player list manager 825 can then retrieve player lineups 710*a-n* associated with the account of the user maintained by the vector management system 800 and identify each of the players included in the respective player lineups 710*a-n* and maintain a count of the number of times a particular player has been selected or included in the player lineups 710*a-n*. In some embodiments, the player list manager 825 can maintain a player list 872 that includes each of the players included in the player lineups 710*a-n*.

In some embodiments, the player list manager 825 can maintain, for each player in the player list 872, a number of lineups of the user in which the player is included. The player list manager 825 can also maintain, for each player in the player list 872, an expiration condition according to which the player will be removed from the player list 872. For instance, the player is removed from the player list when the player is no longer included in any fantasy lineup of the user for contests that are ongoing or are scheduled for the future. As such, the player list manager 825 can remove the player from the player list 872 once the expiration condition is satisfied. In some embodiments, the expiration condition is satisfied when all of the sporting events of a particular fantasy contest have ended. In some embodiments, the expiration condition is satisfied when all of the sporting events of a particular fantasy contest have begun. In some embodiments, the player list manager 825 can receive score updates from one or more content servers and use the score updates to determine when sporting events end. In this way, the player list manager 825 maintains a list of players that are relevant to a user in that the players are part of lineups submitted for contests having one or more sporting events that have yet to be completed. In some embodiments, players may be removed from a player list after a certain amount of time (for example, 1 week, 1 month, 1 year, etc.) has passed since the player was included in a player lineup that was entered into a contest.

Although the player list manager 825 as described herein may receive a list of players associated with a user from the fantasy sports system, the player list manager 825 can be configured to receive the list of players from the client device of the user. In some embodiments the player list manager 825 can be configured to determine the list of players from the request for content received from the user. In some embodiments, the request for content can include the list of players that the user is interested in, which can be based on players that are included in one or more fantasy lineups. In some embodiments, the request for content generated by the client device or the application executing on the client device can include the list of players responsive to determining that a configuration setting for filtering content based on the players included in one or more fantasy lineups of the user. In some embodiments, the request for content can include a flag or other indicator indicating that the status of the configuration setting for filtering the content. For instance, the flag can be set to a first value if the configuration setting is enabled and the flag can be set to a second value if the configuration setting is disabled.

Referring again to the user profile manager 810, the user profile manager 810 can be configured to generate the user vector of a user profile based on input from the contest data manager 820 and the player list manager 825. The user profile manager 810 can generate the multidimensional vector based on the players selected by the user in one or more lineups as well as the contests for which the user has registered. The multidimensional vector can apply weights to different features or values of features based on additional information relating to the user, for instance, a user's geographical location, a user's declared interests, one or more inferred interests or preferences of the user, among others. Furthermore, the user profile manager 810 can import information from other users to further enhance a user's multi-dimensional data structure 605. For instance, the user cluster manager 815 can identify one or more users that are similar to the user based on their respective multidimensional user vectors and can determine information common across some or many users in the cluster of users that the user profile manager 810 may import into the user. For instance, if users in the cluster of users prefer a certain player or players having a certain attribute, the user profile manager 810 may adjust the multidimensional vector of the user to indicate that the user also prefers the certain player or players having the certain attribute.

The lobby manager 830 can comprise components, subsystems, modules, scripts or one or more sets of computer-executable instructions and can be configured to manage one or more lobbies that can be provided to one or more users. A lobby is a data structure that can include one or more contests arranged according to a particular order and can be provided to a device to enable a user to select a contest from the lobby. The user can select a contest to enter the contest or to learn more about the contests. In some embodiments, the lobby manager 830 can be configured to generate a lobby including one or more contests. The lobby can include one or more active contests that are currently in progress, one or more future contests for which registration is still open, and one or more past contests for which the contests have already ended. The lobby manager 830 can be configured to generate a lobby that can be transmitted to a plurality of users or can generate a personalized lobby based on the user vector of a given user. Additional details regarding the lobby manager 830 are described below.

The content selector 835 can comprise components, subsystems, modules, scripts or one or more sets of computer-executable instructions and can be configured to select content to transmit to devices of users associated with user profiles maintained by the vector management system 800. The content selector 835 can be configured to transmit content items responsive to the vector management system 800 or the content management system 206 receiving requests from applications executing on such devices of users.

The content selector 835 can be configured to determine the type of content items to transmit to the application executing on a device of a user responsive to the request received from the application as well as based on state information associated with the application at the time the request was transmitted. The state information associated with the application at the time the request was transmitted can be determined by establishing a persistent connection, such as a web socket connection with the application to determine which page of the application the user is on, one or more configuration settings set on the application, among others. The content selector 835 can determine, from the request or the state information, the type of content to transmit to the client device on which the application is executing.

The content selector 835 can identify, from a plurality of content items accessible to the vector management system 800, a subset of content items to transmit to the application. In some embodiments, the content selector 835 can maintain a queue of content items to transmit to the application. The content items can be selected using the user vector associated with the user. In some embodiments, the queue of content items can be ordered in accordance to chronological order or reverse chronological order. For instance, the content items can be ordered based on a timestamp of the content item such that the content item that the content management system most recently received is placed at the top of the queue of content items. The content selector 835 can be configured to rearrange the content items included in the queue of content items as the user adjusts one or more content filtering parameters on the application. The content selector 835 can prioritize one or more content items over other content items included in the queue of content items. The content filtering parameters can include parameters that affect which content is selected by the content selector 835 for transmission and/or display to the client device. The content filtering parameters may change as the user navigates to different pages on the application or as the user changes the type of content items the user would like to view in the content feed.

The content selector 835 can be configured to assign a priority score to each content item included in the queue. The priority score can be determined based on the tags associated with the content item. The priority score can be determined based on the tags associated with the content item and based on the players included in the player list of the user maintained by the player list manager 825. As players are removed from the player list manager, the priority score of content items having player tags associated with such players can be decreased. Conversely, as players are added to the player list manager, the priority score of content items having player tags associated with players that have been added can be increased. In some embodiments, the content selector 835, or the vector management system 800, may transmit content items based on the priority scores of the content items. Stated in another way, the content selector 835, or the vector management system 800, may transmit content items that relate to players included in the player list before transmitting content items that relate to players not included in the list.

In some embodiments, the content selector 835 can be configured to send all of the content identified or accepted by the vector management system 800. The content selector 835 may send the content with one or more tags assigned by the content labeler. The content selector 835 can be configured to communicate with the application executing on the client device to transmit all of the content items to the client device.

The vector data structure 850 is a data structure that can store one or more user clusters 852 and one or more data structures 605a-n. The vector data structure can be maintained by the vector management system 800. In some embodiments, the vector data structure 850 can be stored on a server of the vector management system 800 or can be accessed by the vector management system.

In some embodiments, the vector management system 800 can be configured to modify the user clusters 852 or data structures 605a-n. In some embodiments, as new data structures 605 are generated, the user vectors can be assigned to one or more user clusters 852 based on a similarity between the user vector and the user clusters 852. In addition, the vector management system can assign one or more tags to each user vector and/or user cluster based on attributes of the user vector or user cluster. These tags can be based on a weight of a particular attribute. For instance, if a user vector includes a lot of players that play football but no players that play basketball, the vector management system 800 can assign a football tag to the user vector. These tags can be used by various modules of the vector management system 800 for selecting content, for arranging lobbies, or for identifying similar users.

Figure 9A:
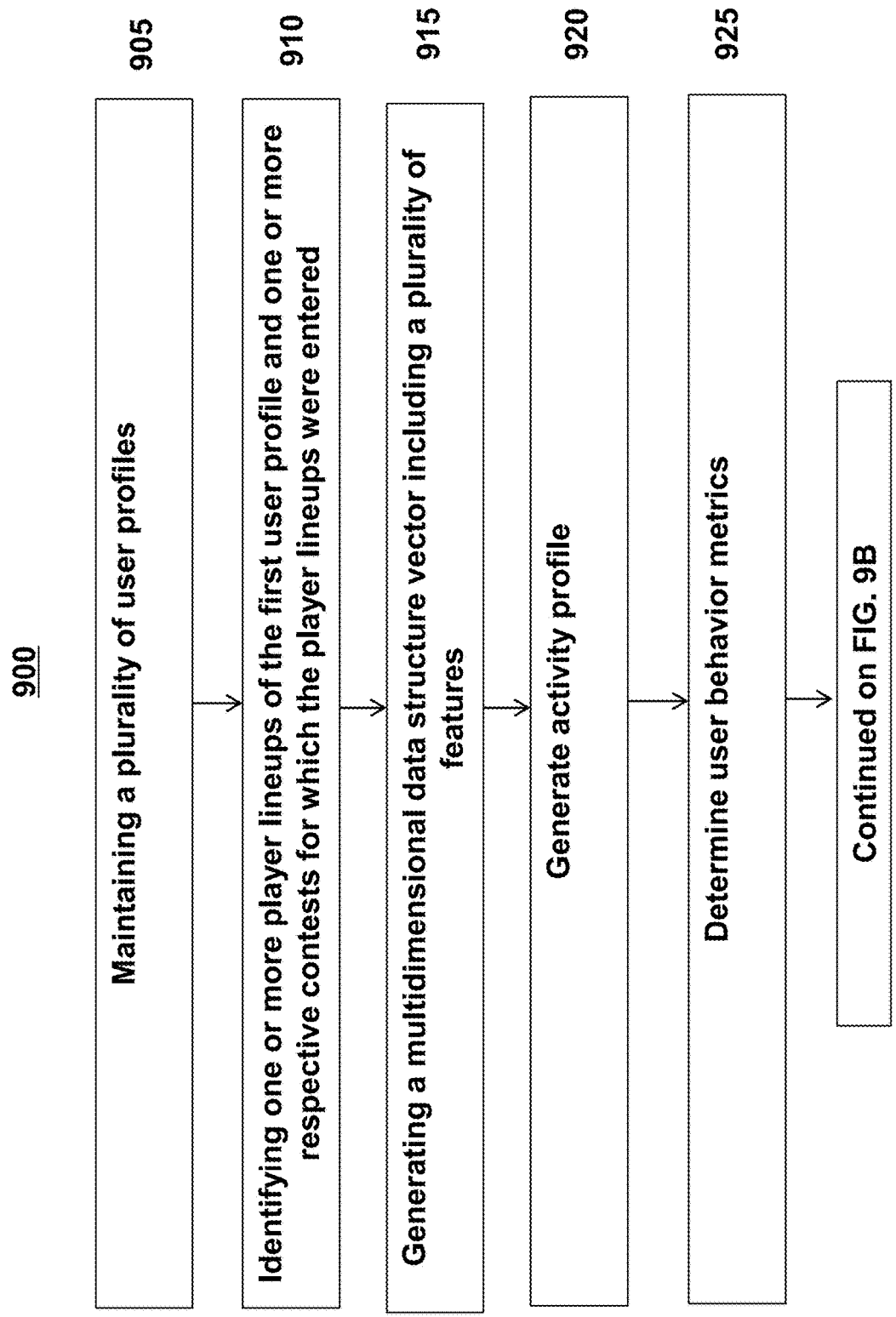

Now referring to FIGS. 9A-9B, a method 900 for generating a multidimensional user vector begins at block 905, by maintaining a plurality of user profiles 610. A vector management system 800 can maintain user profiles 610 for each user participating in a variety of different contests 720. The vector management system 800 can include one or more processors. In embodiments, each of the user profiles 610 can include one or more player lineups 710 associated with at least one fantasy sports contest 720.

A user profile 610 can be generated for a user when the user registers and/or creates a profile with a fantasy sports site or a betting site, or when a user enters a particular contest 720 for a fantasy sports site or a betting site. A contest 720 as used herein may refer to and include fantasy sports contests or betting contests (e.g., contests through online gambling sites). The vector management system 800 can include one or more databases that store each of the user profiles created. For example, the databases can include a plurality of tables and/or files to organize the user profiles based on attributes of the particular user. The databases can include a plurality of entry the actual user profiles 610 (e.g., first user profile 610a of FIGS. 15-16), an identifier linking the respective user profile 610 to an entry in at least one of the databases, and/or an association linking the respective user profile 610 to an entry in at least one of the databases.

The vector management system 800 can maintain user profiles 610 for various types of users, such as casual users and serious users. Each of the user profiles 610 can include an activity profile 730 that includes data corresponding to user interactions with one or more fantasy sports contests executing on a device associated with the respective user. The activity profile 730 can indicate whether the respective user profile 610 corresponds to a casual user or a serious user. Moreover, the activity profile 730 can indicate other types of users, for example, users that only play on weekends, certain days of the week, certain sports or leagues, or certain types of contests, among others. The vector management system 800 can assign one or more tags to each user profile 610 based on the user profile's associated activity and history playing contests. These tags can then be used to determine which contests to promote to a user, which bets to provide to a user, which content items to provide to a user, among others.

Each of the user profiles 610 can include one or more player lineups 710 associated with one or more fantasy sports contests 720. The player lineups 710 can include a listing of players selected by the user for a particular contest 720. In some embodiments, such as for betting contests, the player lineups 710 can include a card selection or betting hand. The player lineups 710 can be associated with a single contest 720 or multiple contests 720. For example, the user can select a player lineup 710 and enter that player lineup 710 into a single contest 720 or enter that player lineup 710 into multiple contests 720. Each of the player lineups 710 created and/or used can be stored in the user profile 610 of the respective user. Thus, the user can access previous player lineups 710 to enter them into future contests 720 and/or modify previous player lineups 710 to enter them into future contests 720.

The vector management system 800 can determine a user type for each user profile 610 in the plurality of user profiles 610 based on a frequency of use, a total winnings value or winnings ratio. The user type can refer to whether the user is a casual user or more frequent user (e.g., hard-core user, serious user). The frequency of use can refer to how often a user participates in contests 720. The total winnings can refer to a total amount of points and/or money a user has won while competing in one or more different contests 720 (e.g., fantasy sports contests, betting contests). The winnings ratio can refer a ratio between the total amount a user has won versus a total number of contests 720 the user has participated in.

The vector management system 800 can determine a skill level for each user profile 610 in the plurality of user profiles 610 based on an outcome value corresponding to one or more fantasy sports contests 720 the respective user participated in. The outcome value can correspond to how many contests 720 the user has participated in. In some embodiments, the outcome value can correspond to the total number of contests 720 the user has participated in and an average place or level the user finished in during the respective contests 720. In some embodiments, the vector management system 800 can determine if the user is a beginner level (e.g., novice) user, intermediate level user or expert level user.

At block 910, one or more player lineups 710 and one or more contests for which the player lineups 710 were entered can be identified for a first user profile 610 of the plurality of user profiles 610. In embodiments, the one or more processors of the vector management system 800 can identify, for a first user profile 610 of the plurality of user profiles 610, one or more player lineups 710 of the first user profile 610 and one or more respective contests 720 for which the player lineups 710 were entered. Each of the player lineups 710 can include a plurality of players. Each of the plurality of players can have one or more player attributes. Each of the contests 720 having one or more contest attributes.

The vector management system 800 can identify at least one user prolife 610 from the plurality of user profiles 610 to generate a multidimensional data structure 605 (e.g., user vector) for. For example, the vector management system 800 can retrieve the first user profile and generate a user vector based on the first user profile. Having selected the first user profile 610, the vector management system 800 can identify player lineups 710 and the contests 720 that those player lineups 710 were entered into by the first user. Each of the player lineups 710 can include a plurality of players with each of the plurality of players having one or more player attributes and each of the contests having one or more contest attributes.

The player attributes can include one or more of the following: a name, a sport category (e.g., type of sport such as but not limited to baseball, football), a location (e.g., home city of the team the player plays for), a team value (e.g., team name), a position value (e.g., the players position), a price parameter (e.g., cost for specific player), and one or more future contests specific to the respective player.

The contest attributes include one or more of the following: a sport category, a price parameter (e.g., entry fee), a prize parameter (e.g., winning payout), a registrant threshold, a registrant limit, a current registrant count, a day value (e.g., day of week), a time value (e.g., time of day), a duration value (e.g., single day, week long, season long, etc.), a contest type, and an experience level (e.g., beginner, intermediate, expert), whether the contest is private versus public.

The vector management system 800 can identify one or more player attributes or one or more contest attributes and use the player or contest attributes to generate a multidimensional data structure 605. For example, the contest attribute "sport category" can be used to identify other user profiles 610 that have previously participated in contests 720 of the same sport category. The vector management system 800 can identify other user profiles 610 having players from the same location and participating in the same sport as the player in the player lineup 710 of the first user profile 610. The vector management system 800 can search and extract the player lineups 710 from one or more user profiles 610 stored a database (e.g., player lineups 710 of FIG. 7) to identify lineups having players from the same team as the first user profile 610. In some embodiments, these other user profiles can be considered similar to the first user profile due to each of their respective player lineups having players from the same sports team. Thus, the similarities between the player attributes and/or contest attributes for different user profiles can be determined by comparing the data structures 605 (e.g., user vectors) of the respective user profiles.

At block 915, a multidimensional data structure 605 can be generated for the first user profile 610. In embodiments, the one or more processors of the vector management system 800 can generate, for the first user profile 610, a multidimensional data structure 605 including a plurality of features 635. Each feature can include a respective value that is based on the player attributes corresponding to the players included in the one or more player lineups 710 and/or the contest attributes corresponding to the one or more respective contests 720 for which the player lineups 710 were entered. The features 635 can correspond to the particular attributes used to identify similarities between the different user profiles.

The vector management system 800 can generate the data structure 605 by identifying associations between two or more player attributes included within a user profile 610. In some embodiments, the association between two or more player attributes can indicate an importance of the respective player attributes to the user profile 610. For example, the vector management system 800 can generate the data structure 605 by identifying the player attributes that appear most frequent within a user profile 610. The vector management system 800 can assign weights to each player attribute such that certain player attributes are given more importance for that particular user profile 610 than other player attributes. For example, the player attributes that appear the most frequent, the top three, the top five or appear over a frequency threshold can be given a greater or higher weight value than those player attributes that appear less frequent, the bottom three, the bottom five or appear in the user profile less than a frequency threshold, which can be given a lower or smaller weight value.

The vector management system 800 can generate the data structure 605 by identifying associations between two or more contest attributes included within a user profile 610. In some embodiments, the association between two or more contest attributes can indicate an importance of the respective contest attributes to the user profile 610. For example, the vector management system 800 can generate the data structure 605 by identifying the contest attributes that appear most frequent within a user profile 610. The vector management system 800 can assign weights to each contest attribute such that certain contest attributes are given more importance for that particular user profile 610 than other contest attributes. For example, the contest attributes that appear the most frequent, the top three, the top five or appear over a frequency threshold can be given a greater or higher weight value than those contest attributes that appear less frequent, the bottom three, the bottom five or appear in the user profile less than a frequency threshold, which can be given a lower or smaller weight value.

The vector management system 800 can generate the data structure 605 by identifying associations between at least one player attribute and at least one contest attribute included within a user profile 610. In some embodiments, the association between all attributes (e.g., player attributes, contest attributes) can indicate an importance of the respective attribute to the user profile 610. The vector management system 800 can generate the data structure 605 by identifying the attributes, whether player attributes or contest attributes, that appear most frequent within a user profile 610. The vector management system 800 can assign weights to each attribute such that certain attributes are given more importance for that particular user profile 610 than other attributes. For example, the attributes that appear the most frequent, the top three, the top five or appear over a frequency threshold can be given a greater or higher weight value than those attributes that appear less frequent, the bottom three, the bottom five or appear in the user profile less than a frequency threshold, which can be given a lower or smaller weight value.

At block 920, an activity profile 730 can be generated. The vector management system 800 can generate at least one activity profile 730 for each user profile 610 having data associated with one or more fantasy sports contests 720 the respective user participated in. For example, the vector management system 800 can identify and generate a listing of previous contests 720 that the user profile 610 has participated in. The vector management system 800 can determine or generate data corresponding to user interactions with one or more fantasy sports contests 720 executing on a device associated with the respective user profile 610. The activity profile 730 can be used to determine a type of user based on the activity profile of the user. In some embodiments, the vector management system 800 can determine, based in part on the number of contests 720 the user profile 610 enters or a frequency at which the user profile 610 is participating in contests 720 or accessing an application (e.g., client application) hosting the contests 720, whether the user profile 610 corresponds to a that is a casual fantasy sports player or a serious fantasy sports player. In some embodiments, the vector management system 800 can store predetermined threshold values with which to compare a user's activity profile to determine the type of user a particular user is.

At block 925, one or more user behavior metrics 650 can be determined. The vector management system 800 can determine one or more user behavior metrics 650 for each user profile 610. The user behavior metrics 650 can include or correspond to a weighted or modified player attribute, a weighted or modified contest attribute, and/or a weighted or modified attribute that is a combination of at least one player attribute and at least one contest attribute. The vector management system 800 can determine user behavior metrics 650 based in part on a frequency of the respective player attribute or contest attribute appears in the user profile 610 and/or an importance of the respective player attribute or contest attribute appears in the user profile 610. For example, a player attribute or contest attribute that appears the most can be given a higher user behavior metric as the respective player attribute corresponds to high percentage behavior of the respective user profile 610 when participating in one or more contests 720. In some For example, a contest attribute may appear often in a user profile 610 because the contest attribute is a common attribute across all user of a fantasy sports system. In one embodiments, a football contest can correspond to the sport type contest attribute and the football contest may correspond to the most common type of contest for all users. Thus, the fact that the football contest appears most frequently in a user profile 610 may not indicate a true importance to the respective user profile 610 and may instead be based in part on the football contest being generally the most common contest attribute. Thus, the vector management system 800 can determine user behavior metrics 650 for attributes based in part on a frequency the attribute appears in a particular user profile 610 and a frequency or average frequency that the same attribute appears in the plurality of user profiles 610. For example, the vector management system 800 may reduce a user behavior metric 650 value for attributes that are common or appear in a large percentage of user profiles 610 of the plurality of user profiles 610. The vector management system 800 may increase a user behavior metric 650 value for attributes that are uncommon, rare, or don't appear in a large percentage of user profiles 610 of the plurality of user profiles 610. The uncommon attribute can be highlighted or given greater importance for the respective user profile 610 such that content 840 corresponding to the uncommon attribute can be generated and/or provided to the respective user profile 610.

In some embodiments, the vector management system 800 can use an activity profile 730 to determine one or more user behavior metrics 650 for a user profile 610 and associations between at least player attribute and the at least one contest attribute. The vector management system 800 can use the activity profile 730 to identify common or most frequent profile attributes and/or contest attributes associated with a user profile 610. The vector management system 800 can generate a user behavior metric 650 using the activity profile 730 to weight particular contests 720 greater for the user profile 610 as compared to other types of contests 720.

At block 930, content 840 can be selected for presentation. In embodiments, the one or more processors of the vector management system 800 can select, using the multidimensional data structure 605, content 840 for presentation to a device associated with the user profile 610. The content 840 can be selected using an association between at least one player attribute and at least one contest attribute identified by the multidimensional data structure 605.

In embodiments, the vector management system 800 can include a content selector 835 having a content matching algorithm to identify content 840 for the first user profile 610 based on the data structure 605 generated for the first user profile 610. The content selector 835 can execute the content matching algorithm to identify content 840 that a first user associated with the first user profile 610 may be interested in based on the user profile's 610 historical data, as well as the historical data of users that are included in the cluster 852 to which the data structure 605 of the first user profile 610 is assigned. For example, the content matching algorithm can use the frequency values and weights to identify which features 635 or attributes appear the most frequently in the respective user profiles 610 and then identify content 840 that include those attributes. In some embodiments, the content 840 can include, but not limited to, future or subsequent contests 720, data for one or more players included within one or more lineups 710 of the user profile 610 and/or advertisements. The vector management system 800 can execute the content selector to identify content 840 the first user or other users similar to the first user are more likely to be interested in. In embodiments, the vector management system 800 can execute the content selector 835 to identify content 840 to provide to a client device associated with the first user profile 610 based in part on the data structure 605 corresponding to the first user profile 610. The content selector 835 can identify content 840 (e.g., content items) from one or more features 635 of the data structure 605. In one embodiments, the vector management system 800 can execute the content selector 835 to determine a user's favorite sport, team or player based on features 635 and user behavior metrics 650 of the data structure 605 for the user profile 610. The vector management system 800 can generate or retrieve content 840 relevant to the particular favorite sport, team or player for presentation to the user at the user's client device.

In some embodiments, the content selector 835 can execute the content matching algorithm to identify content 840 that a first user associated with the first user profile 610 may be interested in and is provided by a third party server (e.g., servers 106a-106b of FIG. 1A). For example, the content matching algorithm can identify attributes (e.g., player attributes, contest attributes) having a particular user behavior metric or in a range of user behavior metric values to identify attributes of interest to the respective user. The vector management system 800 can request content 840 from one or more third party servers corresponding to the attributes having a particular user behavior metric or in a range of user behavior metric values. For example, in one embodiment, the vector management system 800, using the content selector 835, can identify a NASCAR type contest having a particular user behavior metric for the first user profile 610. The vector management system 800 can transmit a request to one or more third party servers for content 840 (e.g., scores, updates, driver information, advertisements) corresponding to the NASCAR type contest.

At block 935, content 840 can be provided to a device associated with the user profile 610 based on the multidimensional data structure 605. In embodiments, the one or more processors of the vector management system 800 can provide, using the generated multidimensional data structure, the content 840 to the device associated with the user profile 610. The vector management system 800 can provide or transmit the content 840 to the device associated with the user profile 610. In embodiments, the vector management system 800 can provide the content 840 to the device through an application (e.g., client application) executing on the respective device associated with the user profile 610. The device can include any client device and/or computing device the user uses to receive data related to a contest and/or participate in a contest, such as but not limited to, client devices 102a-102n of FIG. 1A-1B.

In some embodiments, the content 840 (or content item as also referred to herein) can include recommendations for one or more future contests 720 selected for user profiles 610 using the data structure 605. The recommendations can include can include a media item (e.g. any combination of text, image, video, or user-interactive content), and the media item can reference a contest 720 selected for the user profiles 610 using the data structure 605. The subsequent contests 720 can be selected based in part on one or more of the features 635 included in the data structure 605 and/or one or more user behavior metrics 650 included in the data structure 605. For example, in some embodiments, if a player attribute corresponding to a team location (e.g., hometown, favorite team) and a contest attribute corresponding to a sport type had the highest frequency value in the data structure 605, one or more future or subsequent contests 720 can be recommended for the first user profile 610, or any other profile 610 linked by a cluster 852 or data structure 605, that involves players from that team in that particular sport (e.g., identify contests in which players from the Boston Celtics are involved in). The content 840 can include text that recommends one or more contests 720 to the user profiles 610. The content 840 can include an object, such as a user-selectable hyperlink that initiates a process to download a webpage, or initiate a process of an application, for registering for the one or more contests 720.

In some embodiments, the vector management system 800 can generate, update or modify an activity profile 730 for one or more of the user profiles 610 linked by the cluster 852 and/or the data structure 605. The activity profile 730 can include a user history of the respective user profile 610. For example, the activity profile 730 can include data corresponding to user interactions with one or more fantasy sports contests 720 executing on a device associated with the respective user profile 610. The user history can include one or more historical contests 720 that are associated with a user (e.g. in which a user has participated). The historical contests can be contests 720 in which the user has registered and which have not yet ended or can be contests 720 that have ended. The contest 720 may be associated with information including values for parameters (e.g. any parameters described herein, including contest-generating parameters and context parameters). The vector management system 800 can update or modify the activity profiles 730 of the user profiles 610 linked by a cluster 852 or one or more data structures 605 when a respective user or user profile 610 registers and/or participates in a new contest 720.

At block 940, the vector management system 800 can modify the data structure 605. The vector management system 800 can modify the data structure 605 responsive to a change in an activity profile 730 of a user profile 610 associated with the data structure 605. The vector management system 800 can modify the data structure 605 responsive to a change in an activity profile 730 of one or more of the user profiles 610 linked by a cluster 852 and/or one or more data structures 605. For example, when at least one user profile 610 in the cluster 852 participates in a new contest 720 using a new or existing player lineup 710, the vector management system 800 can update the features 635, frequency values and/or user behavior metrics 650 of the cluster 852 to reflect the changes. In some embodiments, the vector management system 800 can identify new user profiles 610 to link to with a data structure 605 and/or cluster 852. The vector management system 800 can add or link the new user profiles 610 to the data structure 605 and/or cluster 852. The vector management system 800 may remove one or more user profiles 610 from the data structure 605 and/or cluster 852 based on the changes to one or more activity profiles 730.

At block 945, subsequent content 840 can be selected. The vector management system 800 can identify and select new, different, or subsequent content 840 for the first user profile 610 based on the modifications to the data structure 605. For example, the vector management system 800 can modify the data structure 605 responsive to changes to the activity profile 730 of the first user profile 610, changes to one or more lineups 710 of the user profile 610, and/or new contests 720 entered by the user profile 610. The vector management system 800 can select subsequent content 840 for the first user profile 610 based on the modification to the multidimensional data structure 605.

In embodiments, the vector management system 800 can receive one or more contest attributes data from a third party server. The vector management system 800 can use the contest attributes (e.g., scores, updates, information) to determine, using the multidimensional data structure 605, an association between the at least player attribute and/or the at least one contest attributes using the one or more contest attribute from the third party server. For example, the contest attribute from the third party server can include an update (e.g., score update, injury update) to a current contest 720 or a future contest 720 the user profile 610 is registered for. The vector management system 800 can use the contest attribute from the third party server to determine that a player from at least one lineup 710 will participate in the current contest 720 or the future contest 720 the user profile 610 is registered for. The vector management system 800 can update the data structure 605 to include the association or a plurality of associations between the at least player attribute and/or the at least one contest attributes using the one or more contest attribute from the third party server. The vector management system 800 can generate an alert or indication for the user profile 610 to alert the user profile 610 of the update or change to the contest attribute and/or data structure 605. The vector management system 800 can determine a profile association between the user profile 610 and the multidimensional data structure 605. The vector management system can store the profile association in the user profile 610.

In some embodiments, the vector management system can identify and select new, different or subsequent content 840 for a second or different user profile 610 based on the modifications to the data structure 605 and/or cluster 852. For example, the vector management system 800 can update a second or other user profiles 610 linked by the data structure 605 and/or cluster 852 based on the activity profile 730 of the first user or any other activity profile 730 of any other user linked by the data structure 605 and/or cluster 852. The vector management system 800 can continually update and select content 840 for the first user profile 610 or any other user profile 610 linked by the data structure 605 and/or cluster 852 based on changes or modifications to the data structure 605 and/or cluster 852.

In some embodiments, the vector management system 800 can update a second user profile 610, different from the first user profile 610, based on the activity profile 730 of the first user profile 610. The vector management system 800 can update one or more user profiles 610 linked by the data structure 605 and/or cluster 852 based on changes or modifications to at least one user profile 610 linked by the data structure 605 and/or cluster 852 and/or changes or modifications the data structure 605 and/or cluster 852.

In some embodiments, one or more user clusters for multiple user profiles can be generated in the plurality of user profiles using a clustering algorithm.

The vector management system 800 can generate, using a clustering algorithm, a user cluster 852 based on a plurality of multidimensional data structures 605 corresponding to the plurality of user profiles 610. Each user profile 610 in the user cluster 852 can include multiple player attributes in common and/or multiple contest attributes in common.

The vector management system 800 can implement the clustering algorithm to identify user profiles 610 having similarities, such as but not limited to, the player attributes and the contest attributes. In some embodiments, the vector management system 800 can use the clustering algorithm to determine which user profiles 610 should be included in a particular user cluster 852. The clustering algorithm can generate statistics on each of the user profiles 610 and their respective attributes to group user profiles to one or more user clusters 852. The statistics can include the historical data included in the activity profiles 730 of the user profiles 610, the player attributes included in the player lineups 710 in the user profiles 610 and the contest attributes for contests 720 associated with the user profiles 610. In embodiments, the statistics can include user behavior metrics 650 generated for the data structures 605 of the user profiles 610. Each of the plurality of user profiles 610 can be included in one or more user vectors and one or more user clusters.

It should be appreciated that although the specification and claims refer to fantasy sports, the application is not limited to fantasy sports. Rather, the scope of the application may extend to other contexts where a content management server maintains a dynamic set of resources that can be monitored for projected utilization and actions can be taken based on the projected utilization, including the generation or allocation of new resources or actions that cause traffic to be directed to one or more resources of the existing set of resources.

The invention claimed is:

1. A method for generating multidimensional data structures using fantasy sports account activity, comprising:
   maintaining, by one or more processors, a plurality of user profiles, each of the plurality of user profiles having one or more respective player lineups associated with at least one fantasy sports contest;
   identifying, by the one or more processors, for a first user profile of the plurality of user profiles, one or more player lineups of the first user profile and one or more respective contests for which the one or more player lineups were entered, each of the one or more player lineups including a plurality of players, each of the plurality of players having one or more player attributes, each of the one or more respective contests having one or more contest attributes;
   receiving, by the one or more processors from a server, the one or more contest attributes of the one or more respective contests;
   generating, by the one or more processors, for the first user profile, a multidimensional data structure including a plurality of features, wherein each feature is generated based on at least one of the one or more player attributes of the plurality of players included in the one or more player lineups and at least one of the one or more contest attributes of the one or more respective contests for which the one or more player lineups were entered;
   determining, by the one or more processors using the multidimensional data structure, an association between at least one of the one or more player attributes and at least one of the one or more contest attributes using the one or more contest attributes received from the server;
   assigning, by the one or more processors, a priority score to each future contest in a list of future contests based on the plurality of features identified in the multidimensional data structure;
   selecting, by the one or more processors, a future contest from the list of future contests for presentation to a device associated with the first user profile based on the priority score of the future contest; and
   providing, by the one or more processors, a content item corresponding to the future contest to the device associated with the first user profile.

2. The method of claim 1, wherein the one or more player attributes include one or more of the following: a name, a sport category, a location, a team value, a position value, a price parameter and one or more future contests specific to the respective player.

3. The method of claim 1, wherein the one or more contest attributes include one or more of the following: a sport category, a price parameter, a prize parameter, a registrant threshold, a registrant limit, a current registrant count, a day value, a time value, a duration value, a contest type, and an experience level.

4. The method of claim 1, wherein each user profile in the plurality of user profiles includes data corresponding to user interactions with one or more fantasy sports contests executing on a respective device associated with the user profile.

5. The method of claim 1, comprising:
   determining a user type for each user profile in the plurality of user profiles based on a frequency of use; and
   determining a skill level for each user profile in the plurality of user profiles based on an outcome value corresponding to one or more fantasy sports contests the respective user participated in.

6. The method of claim 1, comprising:
   generating an activity profile for each user profile having data associated with one or more fantasy sports contests the respective user participated in;
   modifying the multidimensional data structure responsive to the activity profile of the first user profile; and
   selecting a subsequent content item for the first user profile based on the modification to the multidimensional data structure.

7. The method of claim 6, comprising updating a second user profile based on the activity profile of the first user profile.

8. The method of claim 1, comprising generating, using a clustering algorithm, a user cluster based on a plurality of multidimensional data structures corresponding to the plurality of user profiles, wherein each user profile in the user cluster having multiple player attributes in common and multiple contest attributes in common.

9. The method of claim 1, comprising:
   determining, by the one or more processors, a profile association between the first user profile and the multidimensional data structure; and
   storing, by the one or more processors, the profile association in the first user profile.

10. The method of claim 1, comprising:
    modifying, by the one or more processors, at least one player attribute or at least one contest attribute associated with the first user profile using a user behavior metric from the one or more respective contests for which the one or more player lineups were previously entered; and generating, by the one or more processors, one or more features of the plurality of features to include the at least one modified player attribute or the at least one modified contest attribute.

11. A system for generating multidimensional data structures using fantasy sports account activity, comprising:
one or more processors; and
memory comprising computer-readable instructions stored in memory that, when executed by the one or more processors, cause the one or more processors to:
maintain a plurality of user profiles, each of the plurality of user profiles having one or more respective player lineups associated with at least one fantasy sports contest;
identify, for a first user profile of the plurality of user profiles, one or more player lineups of the first user profile and one or more respective contests for which the one or more player lineups were entered, each of the one or more player lineups including a plurality of players, each of the plurality of players having one or more player attributes, each of the one or more respective contests having one or more contest attributes;
receive, from a server, the one or more contest attributes of the one or more respective contests;
generate, for the first user profile, a multidimensional data structure including a plurality of features, wherein each feature is generated based on at least one of the one or more player attributes of the plurality of players included in the one or more player lineups and at least one of the one or more contest attributes of the one or more respective contests for which the one or more player lineups were entered;
determine, using the multidimensional data structure, an association between at least one of the one or more player attributes and at least one of the one or more contest attributes using the one or more contest attributes received from the server;
assign a priority score to each future contest in a list of future contests based on the plurality of features identified in the multidimensional data structure;
select a future contest from the list of future contests for presentation to a device associated with the first user profile based on the priority score of the future contest; and
provide a content item corresponding to the future contest to the device associated with the first user profile.

12. The system of claim 11, wherein the one or more player attributes include one or more of the following: a name, a sport category, a location, a team value, a position value, a price parameter and one or more future contests specific to the respective player; and the one or more contest attributes include one or more of the following: a contest sport category, a contest price parameter, a prize parameter, a registrant threshold, a registrant limit, a current registrant count, a day value, a time value, a duration value, a contest type, and an experience level.

13. The system of claim 11, wherein the computer-readable instructions, when executed by the one or more processors, further cause the one or more processors to:
determine a user type for each user profile in the plurality of user profiles based on a frequency of use; and
determine a skill level for each user profile in the plurality of user profiles based on an outcome value corresponding to one or more fantasy sports contests the respective user participated in.

14. The system of claim 11, wherein the computer-readable instructions, when executed by the one or more processors, further cause the one or more processors to:
generate an activity profile for each user profile having data associated with one or more fantasy sports contests the respective user participated in;
modify the multidimensional data structure responsive to the activity profile of the first user profile; and
select a subsequent content item for the first user profile based on the modification to the multidimensional data structure.

15. The system of claim 14, wherein the computer-readable instructions, when executed by the one or more processors, further cause the one or more processors to update a second user profile based on the activity profile of the first user profile.

16. The system of claim 11, wherein the computer-readable instructions, when executed by the one or more processors, further cause the one or more processors to generate, using a clustering algorithm, a user cluster based on a plurality of multidimensional data structures corresponding to the plurality of user profiles, wherein each user profile in the user cluster having multiple player attributes in common and multiple contest attributes in common.

17. The system of claim 11, wherein the computer-readable instructions, when executed by the one or more processors, further cause the one or more processors to:
determine a profile association between the first user profile and the multidimensional data structure; and
store the profile association in the first user profile.

18. The system of claim 11, wherein the computer-readable instructions, when executed by the one or more processors, further cause the one or more processors to:
modify at least one player attribute or at least one contest attribute associated with the first user profile using a user behavior metric from the one or more respective contests for which the one or more player lineups were previously entered; and
generate one or more features of the plurality of features to include the at least one modified player attribute or the at least one modified contest attribute.

* * * * *